(12) United States Patent
Hatae et al.

(10) Patent No.: US 6,332,159 B1
(45) Date of Patent: *Dec. 18, 2001

(54) DATA COMMUNICATION SYSTEM, APPARATUS AND CONTROLLING METHOD THEREOF

(75) Inventors: Shinichi Hatae, Kawasaki; Takashi Kobayashi, Mitaka, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,115

(22) Filed: Dec. 4, 1997

(30) Foreign Application Priority Data

| Dec. 4, 1996 | (JP) | 8-324454 |
| Dec. 4, 1996 | (JP) | 8-324455 |
| Dec. 12, 1996 | (JP) | 8-332570 |
| Dec. 2, 1997 | (JP) | 9-331690 |

(51) Int. Cl.⁷ ............................................. G06F 15/16
(52) U.S. Cl. ........................ 709/224; 709/220; 709/224
(58) Field of Search ................................ 709/220, 221, 709/224

(56) References Cited

U.S. PATENT DOCUMENTS

| 5,084,870 | * | 1/1992 | Hutchinson et al. | 370/94.1 |
| 5,319,633 | * | 6/1994 | Geyer et al. | 370/17 |
| 5,600,632 | * | 2/1997 | Schulman | 370/252 |
| 5,659,543 | * | 8/1997 | Ater et al. | 370/258 |
| 5,724,517 | * | 3/1998 | Cook et al. | 395/200.57 |
| 5,729,685 | * | 3/1998 | Chatwani et al. | 395/200.11 |
| 5,737,319 | * | 4/1998 | Croslin et al. | 370/255 |
| 5,751,698 | * | 5/1998 | Cushman et al. | 370/252 |
| 5,751,967 | * | 5/1998 | Raab et al. | 395/200.58 |
| 5,809,331 | * | 9/1998 | Staats et al. | 395/830 |
| 5,887,139 | * | 3/1999 | Madison, Jr. et al. | 395/200.53 |
| 5,923,673 | * | 7/1999 | Henrikson | 371/20.1 |
| 5,940,376 | * | 8/1999 | Yanacek et al. | 370/250 |
| 6,020,899 | * | 2/2000 | Long . | |

* cited by examiner

Primary Examiner—Robert B. Harrell
Assistant Examiner—Steve Willett
(74) Attorney, Agent, or Firm—Fitzpatrick, Cella, Harper & Scinto

(57) ABSTRACT

In a data communication system composed of plural equipment, there are provided display means for displaying the connection relationship among the plural equipment, and designation means for designating a specified equipment displayed by the display means. The user can easily confirm the connection state and the connection position of the specified equipment, by effecting communication for confirming the connection relationship of the specified equipment, according to the designation by the designation means. Also the user can easily understand the flow of the signals in the data communication system, by displaying the channel information, indicating the data flow among the equipment, and the equipment information.

14 Claims, 26 Drawing Sheets

FIG. 14

|  | NODE TYPE | NODE ID |
|---|---|---|
| DVTR−A | 001000 | 3 |
| DVTR−B | 001001 | 2 |
| PRINTER | 000000 | 0 |
| ⋮ | ⋮ | ⋮ |

1402 — NODE TYPE column
1401 — NODE ID column

FIG. 24

| NODE ID | DEVICE INFORMATION | OPERATION STATE | TRANSMITTING NODE | RECEIVING NODE | CHANNEL NO. |
|---|---|---|---|---|---|
| NO. 0 | DVTR-A (2101) | RECORD | — | ○ | 0 |
| NO. 1 | DVTR-B (2102) | REPRODUCTION | ○ | — | 1 |
| NO. 2 | DVTR-C (2103) | REPRODUCTION | ○ | — | 0 |
| NO. 3 | MONITOR (2106) | IN OPERATING | — | — | — |
| NO. 4 | DVTR-E (2105) | RECORD | — | ○ | 1 |
| NO. 5 | DVTR-D (2104) | RECORD | — | ○ | 1 |

DATA COMMUNICATION SYSTEM, APPARATUS AND CONTROLLING METHOD THEREOF

BACKGROUND OF THE INVENTION

1. Field of the Invention

The present invention relates to a data communication system, an apparatus and a method therefor and a program contained in a computer-readable medium for confirming the network connection relationship, and more particularly to a technology for managing the network constructed through a digital interface for communication.

2. Related Background Art

With the recent development of digital audio-visual equipment such as a digital camera or a digital video camera, there is being developed a technology of constructing a network by connecting the peripheral equipment (printer, hard disk etc.) of the personal computer (hereinafter represented as PC) and such audio-visual (AV) equipment through a common digital communication interface.

Among the technologies employable in such communication system, there is already known the IEEE 1394 standard (IEEE Standard 1394-1995, represented hereinafter as IEEE 1394 Standard) relating to the high performance serial bus.

The communication interface based on the IEEE 1394 Standard (hereinafter represented as 1394 interface) is a digital interface capable of bidirectional communication and is capable of serially transmitting data packets at a high speed. The 1394 interface has the following features:

(1) It has two transfer modes, namely the isochronous mode and the asynchronous mode. The isochronous mode, guaranteeing the transmission and reception of a predetermined amount of packets within a communication cycle time (125 μs), is effective for real-time transfer of the image data or the voice data. The asynchronous mode transmits and receives the control commands and the files when necessitated in asynchronous manner, and has a lower priority in comparison with the isochronous mode;

(2) It has a higher freedom of connection, allowing to use the daisy chain system and the node branched system in mixed manner and enabling to construct a network of higher freedom;

(3) It is capable of automatic recognition of the network configuration. More specifically, the interface is provided, in response to a change in the network configuration caused by the start or termination of the power supply or by the addition or deletion of an electronic equipment, with a function of automatically setting and recognizing the ID information set on each electronic equipment on the network; and (4) There can be employed a finer cable with smaller connectors, since the data transfer between the 1394 interfaces is conducted in serial manner.

FIG. 1 shows a digital communication system constructed with plural electronic equipment provided with the 1394 interfaces mentioned above.

In FIG. 1, there are a printer 101, a personal computer 102, a digital video tape recorder A (DVTR-A) 103, a digital video tape recorder B (DVTR-B) 104 and a video disk 105. These equipment are connected through communication cables 106 based on the IEEE 1394 Standard.

In the communication system shown in FIG. 1, the 1394 interface constantly monitors the change in the configuration of the connections, caused by the start or termination of the power supply in each equipment or by the addition or relation of the equipment, and, upon detecting a change in the configuration (topology), the 1394 interface of each equipment automatically executes a process of recognizing the network topology and providing each equipment (hereinafter called node) with the ID information (hereinafter called node ID).

The recognition of the configuration of the connections is executed, after a bus resetting (initialization of the bus with clearing of the information on the connection configuration), by the declaration of the mother-daughter relationship by the nodes. By the determination of the mother-daughter relationship among the nodes, the nodes recognize the connection configuration of the network in the form of a tree structure (hierarchic structure). An equipment which becomes the mother (or highest rank) of all the equipment constitutes a root node and manages the mediation of the bus use right.

After the determination of the root node, the network automatically sets a physical address (namely node ID) for each node. The setting of the node ID is basically executed a process in which a mother node permits the setting of a physical address to a daughter node connected to a communication port of a smaller port number and then such daughter in turn permits the setting of physical addresses in succession to its daughter nodes. After the ID setting in all the daughter nodes, the mother node sets its own node ID.

In the following there will be explained the automatic setting process of the node ID's, with reference to FIG. 1, in which the personal computer 102 is assumed to become the root node after the recognition of the connection configuration.

Referring to FIG. 1, the PC 102 constituting the root node at first permits a node connected to the communication port of a port number "#1", which is the printer 101, to set the node ID. The printer 101 sets "No. 1" as its own node ID and transfers this result, by a self ID packet, to all the equipment on the bus (broadcasting). As a result, all the equipment on the network recognizes that the "node ID No. 0" is already assigned, and an equipment which next obtains the permission for the node ID setting selects No. 1.

After the node ID setting of the printer 101, the personal computer 102 permits a node connected to the communication port of a port number "#2", which is the DVTR-A 103, to set the node ID. The DVTR-A 103 in turn gives permissions to daughter nodes (DVTR-B 104 and video disk 105) in the increasing order of the port number of the communication ports, namely in the order of the DVTR-B 104 at first and then the video disk 105. The DVTR-B 104 and the video disk 105 set the node ID's "No. 1" and "No. 2" in succession and then broadcast self ID packets. After the node is setting of the DVTR-B 104 and the video disk 105, the DVTR-A 103 sets its own node ID as "No. 3", and finally the root node (PC) 102 sets its own node ID as "No. 4" whereby the recognition of the connection configuration is completed.

The 1394 interface is provided with two transfer modes, namely the asynchronous transfer mode and the isochronous transfer mode. An asynchronous packet is composed of a header portion, a header CRC, a data portion and a data CRC. The header portion contains address ID information (node ID of the addressee node), source ID information (node ID of the packet transmitting node) and various control information, and the asynchronous packet is transferred to a node designated by the address ID information. The node receiving the asynchronous packet always returns an acknowledgment but does not return the acknowledgment if it is a broadcast packet.

An isochronous packet is composed of a header portion, a header CRC, a data portion and a data CRC. The header portion contains channel number information (a number given to a band width capable of transferring the isochronous packet) and various control information. The isochronous packet is not transferred to a specified node but broadcast to the entire bus. Consequently each node can receive the predetermined isochronous packet by detecting the channel number. The node receiving the isochronous packet does not return the acknowledgment.

However, the communication system constructed with the above-explained 1394 interfaces has been associated with the following drawbacks.

The 1394 has the advantage capable of adapting to the daisy chain system and to the node branched system in order to achieve a high freedom of connection. However, in case a complex network is constructed by connecting plural electronic equipment in succession, the user becomes unable to identify the position of the desired electronic equipment within such network.

Also in case of a failure in a communication cable or a connector in such network, the user is unable to recognize the position of such failed connection.

Furthermore, it is very difficult for the user to recognize all the signals inputted into and outputted from these equipment.

SUMMARY OF THE INVENTION

An object of the present invention is to solve the above-mentioned drawbacks.

Another object of the present invention is to provide a process which, in a data communication apparatus, allows the user to easily confirm the connection state and the connection position of the desired equipment.

The above-mentioned objects can be attained, according to a preferred embodiment of the present invention, by a data communication apparatus connectable to a data communication system composed of plural equipment, the apparatus comprising:

a) display means for displaying the connection relationship of the plural equipment;

b) designation means for designating a specified equipment displayed by the display means; and c) communication means for effecting, with the specified equipment, a communication for confirming the connection relationship with the specified equipment according to the designation by the designation means.

Also according to another embodiment of the present invention, there is provided a data communication apparatus connectable to a communication system capable of automatically recognizing the connection relationship of plural equipment at each change of the connection configuration of the plural equipment, the apparatus comprising:

a) display means for displaying the connection relationship of the plural equipment;

b) designation means for designating a specified equipment displayed on the display means; and c) communication means for effecting, with the specified equipment, a communication for controlling the function of the specified equipment, according to the designation by the designation means.

Also according to still another embodiment of the present invention, there is provided a data communication apparatus connectable to a communication system composed of plural equipment, the apparatus comprising:

a) reception means for receiving confirmation data, transmitted by a predetermined equipment, for confirming the connection state; and b) display means for effecting a display indicating the reception of the confirmation data.

Also according to still another embodiment of the present invention, there is provided a data communication apparatus capable of automatically recognizing the change in the connection configuration, the apparatus comprising:

a) communication means for recognizing ID information set on an equipment connected to a data bus and effecting communication utilizing the ID information;

b) generation means for generating inquiry data for inquiring the equipment information of the equipment indicated by the ID information; and c) preparation means for preparing a table showing the correspondence between the ID information and the equipment information, based on a response to the inquiry data transmitted by the communication means.

Still another object of the present invention is to provide a process which, in a data communication apparatus, allows the user to easily understand the data flow among the equipment.

The above-mentioned object can be attained, according to a preferred embodiment of the present invention, by a data communication apparatus connectable to a communication system composed of plural equipment, the apparatus comprising:

a) detection means for detecting the signal flow among the plural equipment; and b) display means for displaying, together with the equipment information of the plural equipment, channel information indicating the signal flow among the plural equipment.

Still another object of the present invention is to provide a process which, in a data communication apparatus, allows the user to easily confirm the connection state and the connection position of a desired equipment.

The above-mentioned object can be attained, according to a preferred embodiment of the present invention, by a data communication method adapted for use in a data communication system apparatus composed of plural equipment, the method comprising:

a) a display step of displaying the connection relationship of the plural equipment;

b) a designation step of designating a specified equipment displayed by the display step; and c) a communication step of effecting, with the specified equipment, a communication for confirming the connection relationship with the specified equipment according to the designation by the designation step.

Still another object of the present invention is to provide a process which, in a data communication method, allows the user to easily understand the data flow among the equipment.

The above-mentioned object can be attained, according to a preferred embodiment of the present invention, by a data communication method apparatus adapted for use in to a communication system composed of plural equipment, the method comprising:

a) a detection step of detecting the signal flow among the plural equipment; and b) a display step of displaying, together with the equipment information of the plural equipment, channel information indicating the signal flow among the plural equipment.

Still another object of the present invention is to provide a process which, in a data communication system, allows the user to easily confirm the connection state and the connection position of the desired equipment.

The above-mentioned object can be attained, according to a preferred embodiment of the present invention, by a data communication system composed of plural equipment, comprising:

a) display means for displaying the connection relationship of the plural equipment;

b) designation means for designating a specified equipment displayed by the display means; and c) communication means for effecting, with the specified equipment, a communication for confirming the connection relationship with the specified equipment according to the designation by the designation means.

Also according to another embodiment of the present invention, there is provided a data communication system composed of plural data communication apparatus, comprising:

a) a first data communication apparatus equipped with communication means for transmitting confirmation data for confirming the connection state in the data communication system; and b) a second data communication apparatus equipment with display means for effecting a display indicating the reception of the confirmation data.

Still another object of the present invention is to provide a program contained in a computer-readable medium and adapted for allowing the user to easily confirm the connection state and the connection position of the desired equipment.

The above-mentioned object can be attained, according to a preferred embodiment of the present invention, by a program contained in a computer-readable medium and adapted for confirming the connection relationship of a network, the program comprising:

a) a display step of displaying the connection relationship of the plural equipment;

b) a designation step of designating a specified equipment displayed by the display step; and c) a communication step of effecting, with the specified equipment, a communication for confirming the connection relationship with the specified equipment according to the designation by the designation step.

Still other objects of the present invention, and the features thereof, will become fully apparent from the following detailed description of the embodiments.

BRIEF DESCRIPTION OF THE DRAWINGS

FIG. 14 is a view showing an example of data stored in an ID table memory 1210;

FIG. 24 is a view showing the content of a management table, managing the information relating to the isochronous data flow;

DESCRIPTION OF THE PREFERRED EMBODIMENTS

Now the present invention will be clarified in detail by the preferred embodiments thereof, with reference to the accompanying drawings.

First Embodiment

Figure 1:
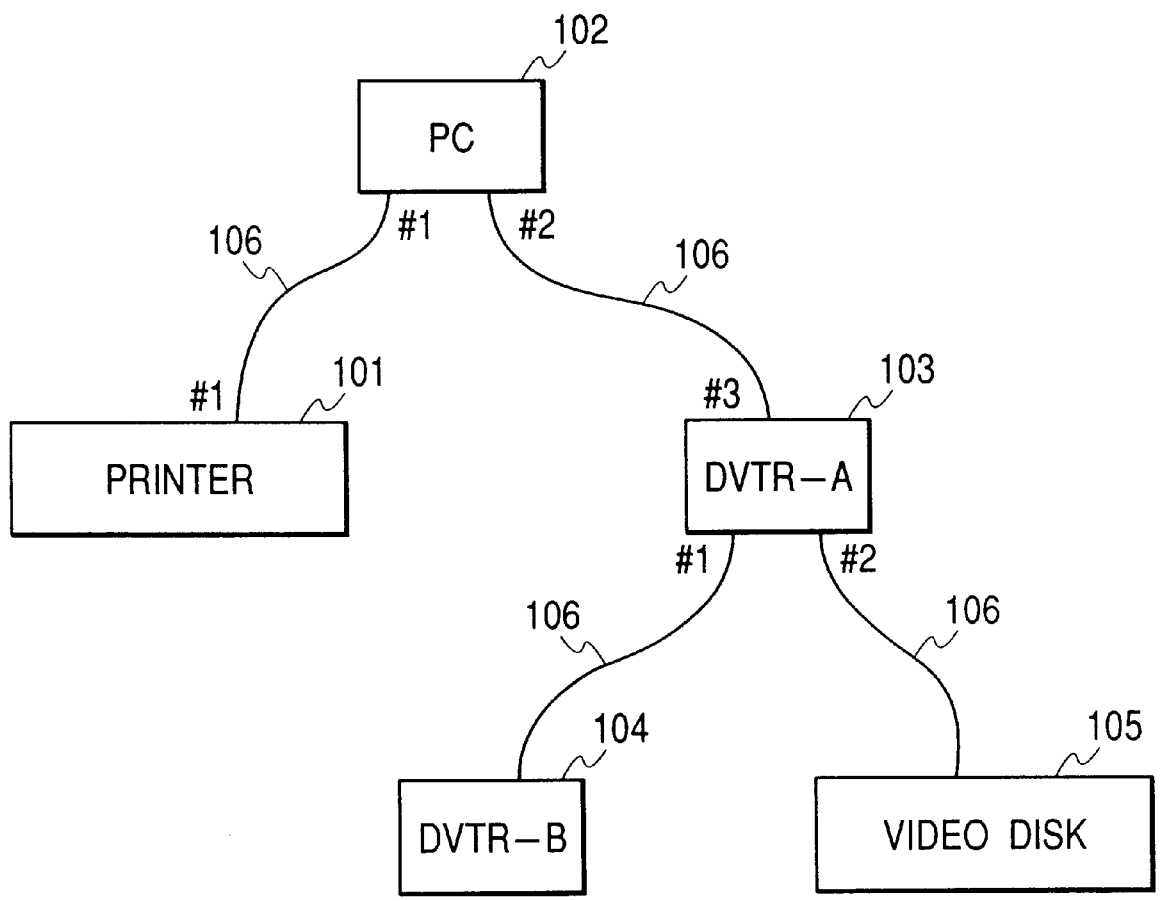
FIG. 1 is a view showing a digital communication system composed of plural electronic equipment equipped with 1394 interfaces.
Figure 2:
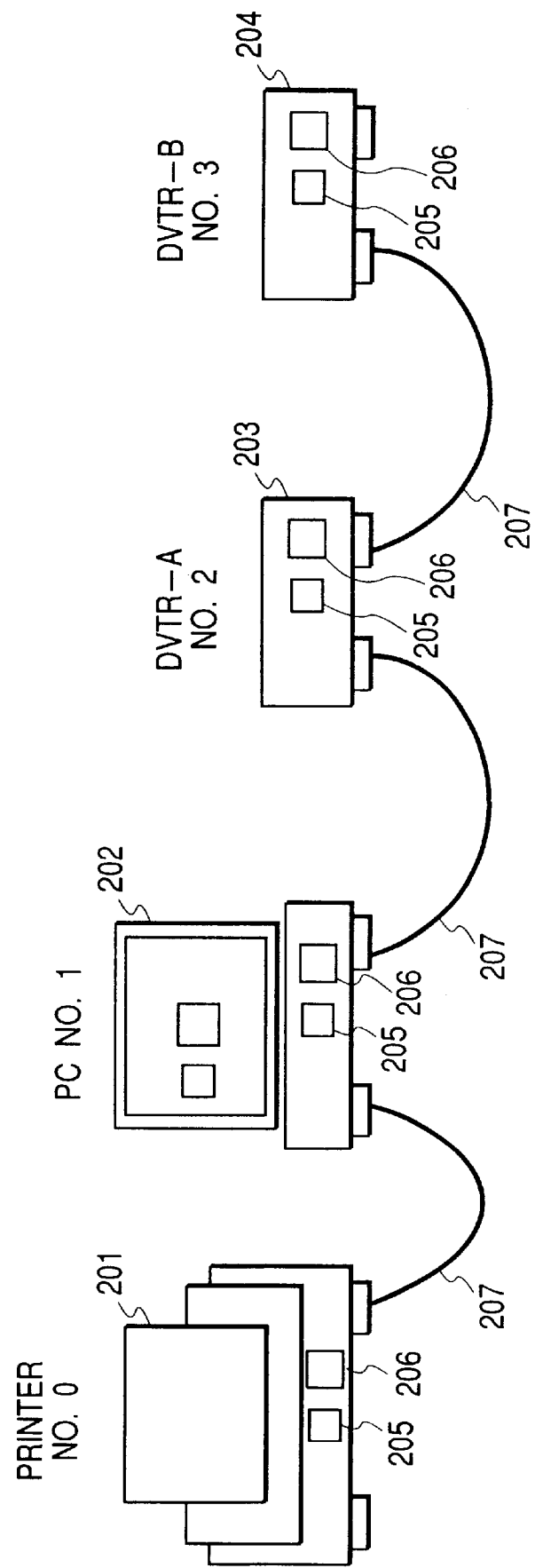
FIG. 2 is a view showing the configuration of a bus system in a first embodiment of the present invention.

FIG. 2 shows a bus system composed by connecting plural digital data communication apparatus (hereinafter called nodes) equipped with 1394 interfaces. This bus system executes communication by a communication method based on the IEEE 1394 standard.

In FIG. 2, there are shown a printer 201; a personal computer (PC) 202; a first digital video tape recorder (DVTR-A) 203; a second digital video tape recorder (DVTR-B) 204; a connection confirming button 205 provided in each of the nodes 201–204; a connection confirming display unit 206 provided in each node; and a communication cable 207.

The bus system composed of the plural nodes as shown in FIG. 2 executes, after the bus resetting, automatic assignment of the node ID's (physical addresses) according to the connection configuration of the nodes. As an example, in the configuration shown in FIG. 2, a node ID "No. 0" is assigned to the printer 201, "No. 1" to the PC 202, "No. 2" to the DVTR-A 203, and "No. 3" to the DVTR-B 204. The node ID's of the nodes are assigned according to a procedure based on the IEEE 1394 standard.

In the above-mentioned bus system, the user can confirm the connection state of the nodes by actuating the connection confirming button for example of the DVTR-B 204. In this operation, if all the nodes on the bus are properly connected, the connection confirming display units 206 provided in all the nodes are turned on or intermittently blink, thereby providing a display easily recognizable by the user. Also, in confirming the proper connections with the DVTR-B 204, the connection confirming display units 206 of the units may provide voice displays or message displays with liquid crystal panels, instead of the lighting or blinking.

As explained in the foregoing, the user can easily confirm that all the nodes are properly connected, if the connection confirming display units 206 of all the nodes are turned on or blink.

However, if the connection confirming display units 206 of all the nodes are not turned on, for example if the display unit of the DVTR-A 203 is turned on but those of the PC 202 and the printer 201 are not turned on, the user can confirm that the connection between the DVTR-B 204 and the DVTR-A 203 is normal but the connection between the PC 202 and the DVTR-A 203 is defective.

By further actuating the connection confirming button of the printer 201 in this state, the user can specify the position of the failed connection between the nodes. If the display units of the DVTR-A 203 and the DVTR-B 204 are not turned on but that of the PC 202 is turned on, the user can confirm that the connection between the printer 201 and the PC 202 is normal but the connection between the PC 202 and the DVTR-A 203 is defective.

As explained in the foregoing, by two confirming operations, the user can finally confirm that the connection between the PC 202 and the DVTR-A 203 has a failure such as disconnection or short circuiting in the cable or in the connector.

Consequently, by suitably actuating the connection confirming buttons of the nodes, the user can confirm whether each connection between the nodes has a defect.

In the present embodiment, the connection confirming button 205 and the connection confirming display unit 206 in each node are realized with a hardware structure, but it is also possible to provide each node with a display device such as a monitor or a liquid crystal display panel with a software to display a connection confirming button and a connection confirming display on such display device. As an example, a connection confirming button 205 and a connection confirming display unit 206 may be displayed on the monitor provided in the PC 202, whereby the user is enabled to confirm the connection state by actuating such confirming button.

Figure 3:
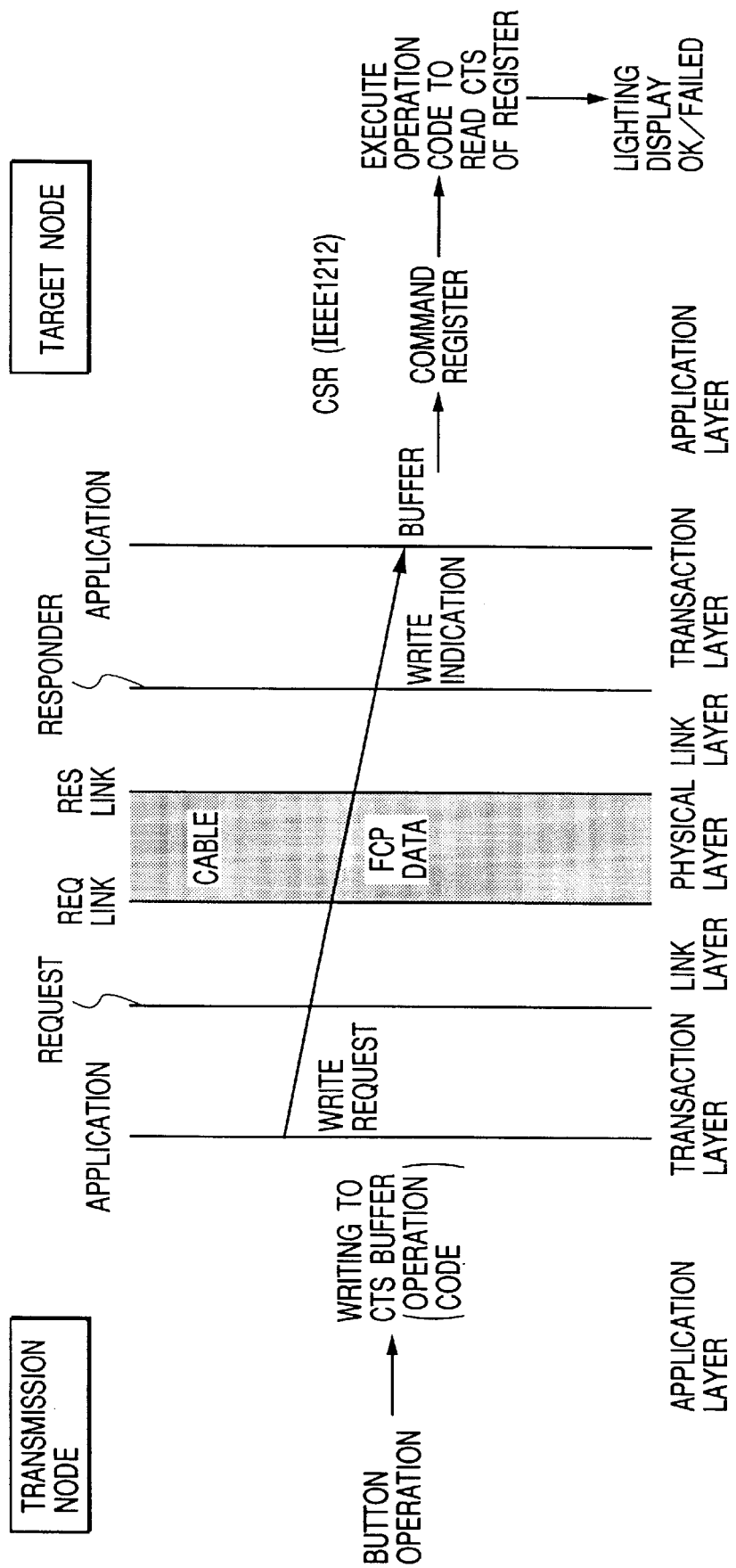
FIG. 3 is a view showing a connection confirming transaction process in the first embodiment.

FIG. 3 is a view showing a connection confirming transaction process based on the IEEE 1394 standard, representing a connection confirming transaction from the actuation of the connection confirming button 205 of a transmitting node to the display of the result by the connection confirming display unit 206 of a target node. The basic transaction is based on the IEEE 1394 standard and will not be explained in detail.

In FIG. 3, the left-hand side shows the flow of operations in a transmitting node (in which the user instructs the confirmation of connection state), while the right-hand side shows the flow of operations in a target node (which indicates the connection state to the user). The central part shows layers of the 1394 interfaces provided in the transmitting node and in the target node, and vertical lines indicate the boundaries of the layers.

Figure 4:
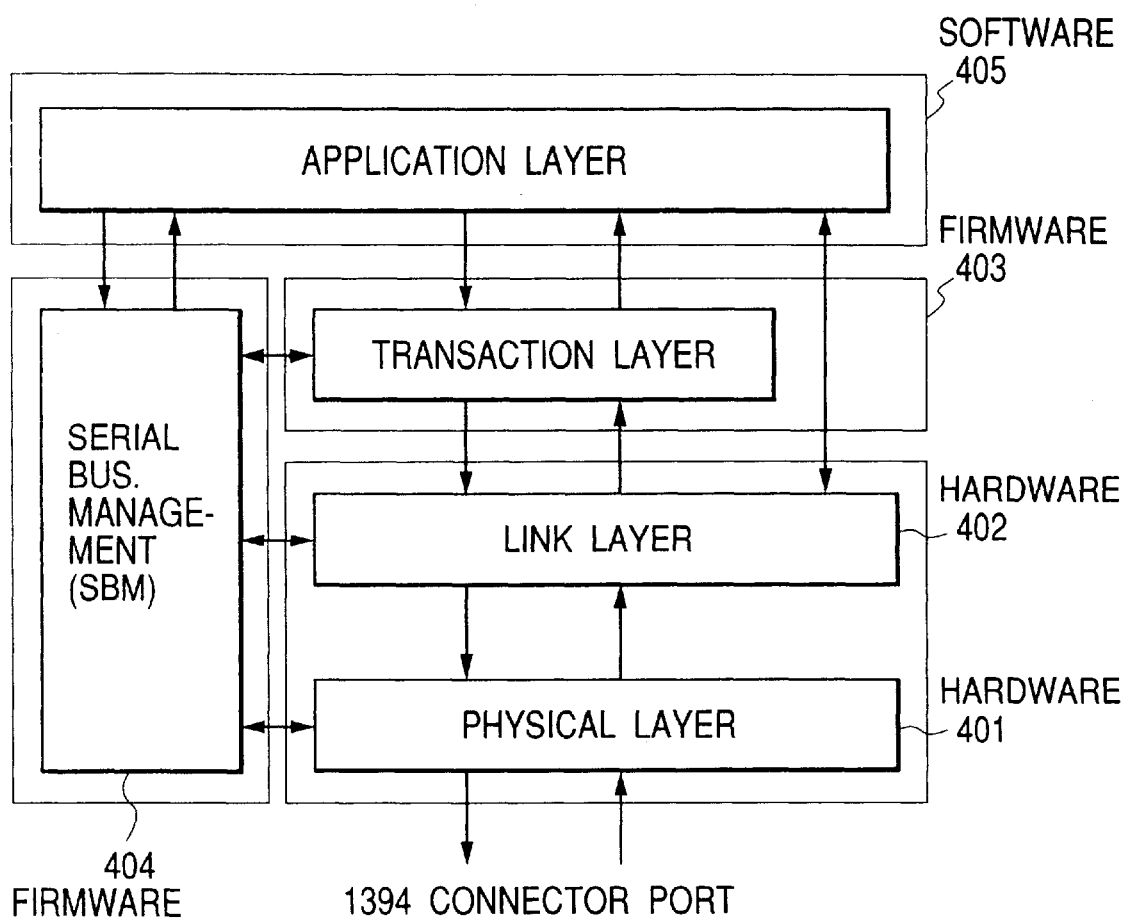
FIG. 4 is a view showing components constituting the 1394 interface.

The 1394 interface in each node is composed of a physical layer, a link layer, a transaction layer and an application layer (cf. FIG. 4).

Referring to FIG. 4, the physical layer 401 defines the electrical specifications of the encoding method and the signals; the link layer defines the protocols for read-out, writing etc.; the transaction layer is a driver for managing the operations to be executed to the 1394 interface; the serial bus management 404 is a driver for managing the network based on the IEEE 1394 standard; and the application layer 405 is a software managing the transaction layer 403 and the serial bus management 404.

When the connection confirming button 205 of the transmitting node is actuated, it generates a connection confirming packet for confirming the connection of each target node. The connection confirming packet is transmitted, by broadcasting (BC), to all the nodes (target nodes) on the bus. Each target node receives the connection confirming packet and executes a connection confirming command contained therein, thereby effecting a display for confirming the connection, utilizing the connection confirming display unit 206.

Figure 5:
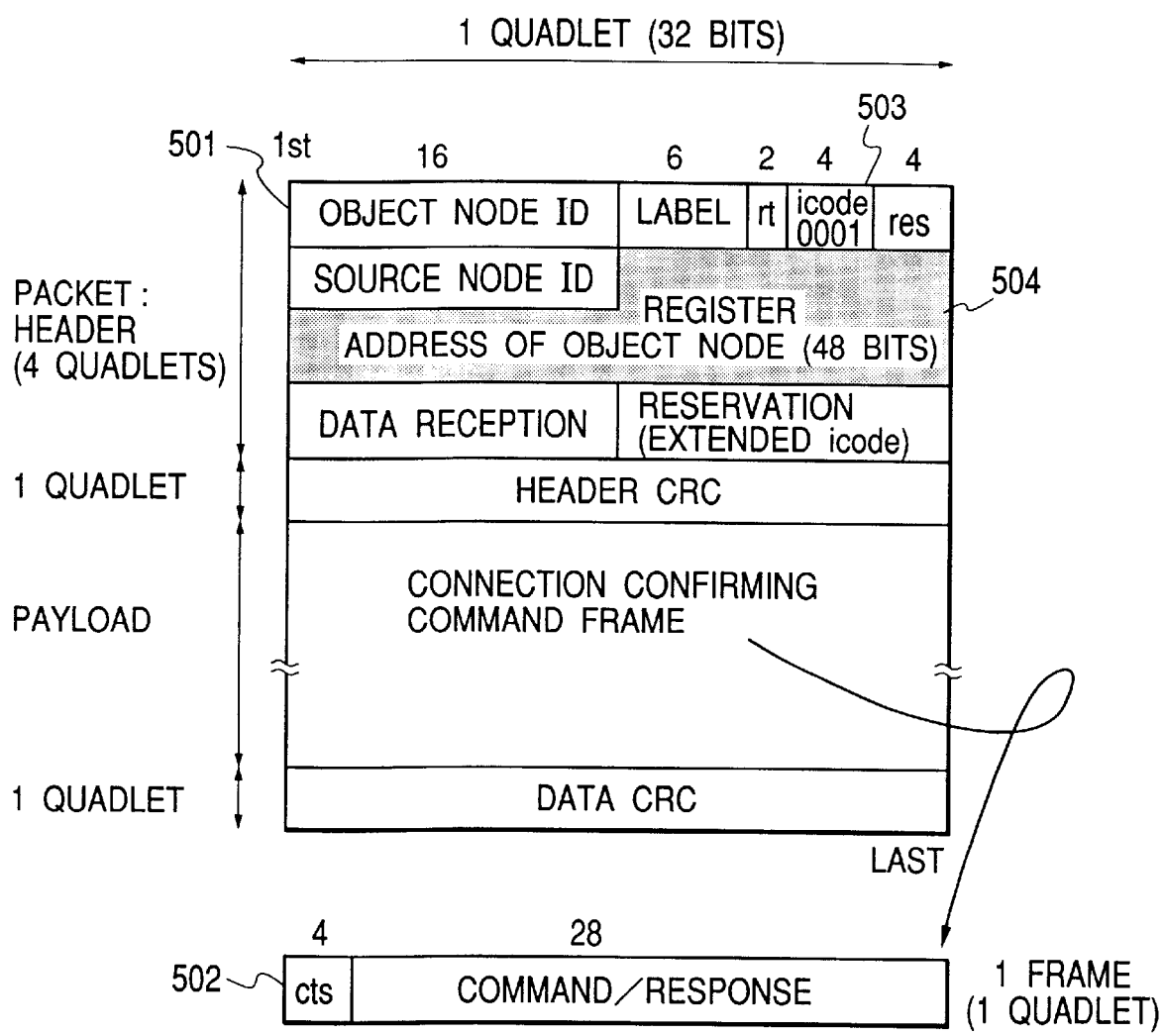
FIG. 5 is a view showing an example of the configuration of a connection confirming packet in the asynchronous transfer mode.
Figure 6:
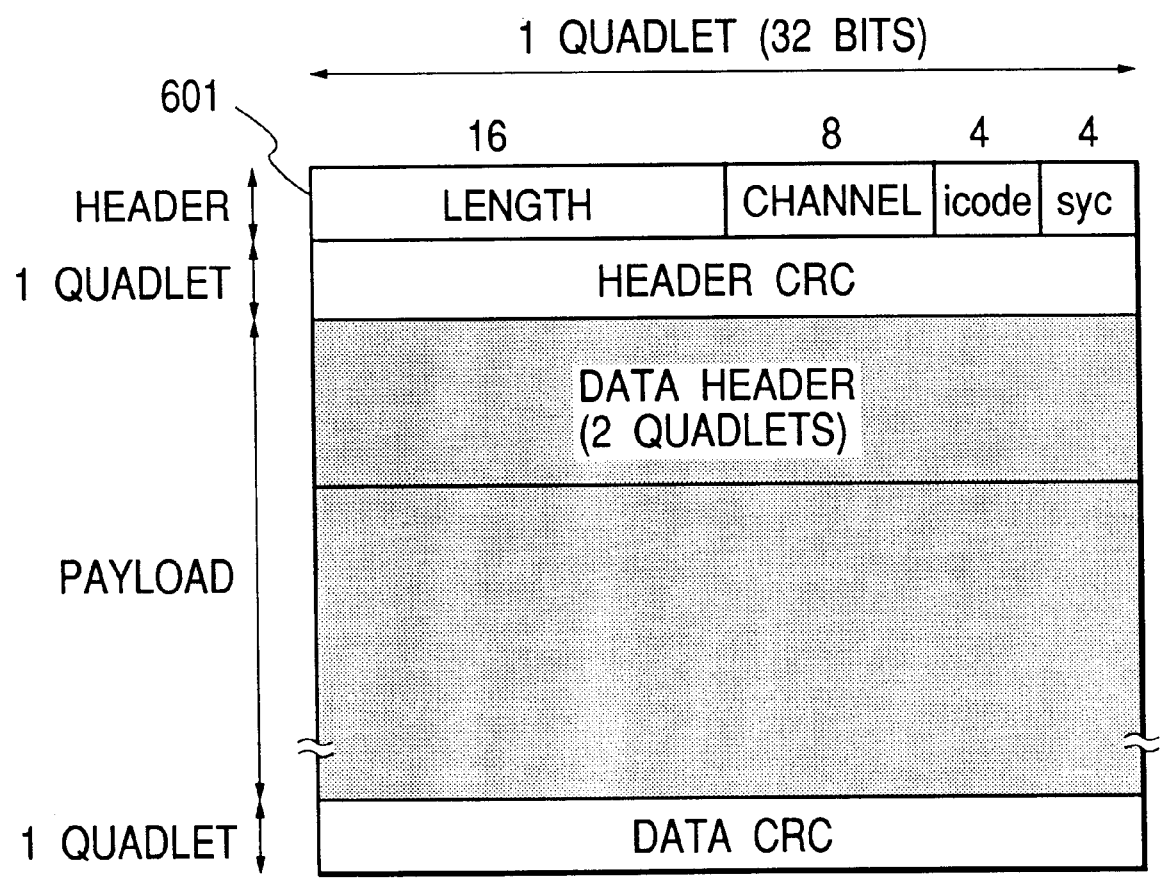
FIG. 6 is a view showing an example of the configuration of a connection confirming packet in the isochronous transfer mode.

FIGS. 5 and 6 shows examples of the configuration of the connection confirming packet, respectively in the asynchronous transfer mode and in the isochronous transfer mode. The configuration of the packet in each transfer mode is based on the IEEE 1394 standard and will not be explained in detail.

In generating the connection confirming packet in the asynchronous transfer mode (cf. FIG. 5), the transmitting node sets a code (FFFF$_{16}$) indicating the broadcasting in the target node ID 501 of the packet header and also sets a connection confirming command 502 in the payload. Also in generating the connection confirming packet in the isochronous transfer mode (cf. FIG. 6), the transmitting node in advance causes all the nodes of the bus system to support the reception of the isochronous packet, sets a code indicating the broadcasting in the channel number 601 of the packet header and also sets a connection confirming command 502 in the payload.

Thus the connection confirming packet generated in the transmitting node can utilize the isochronous transfer mode or the asynchronous transfer mode, it is determined in advance in the application. However, in case of the asynchronous transfer mode, by setting in advance a code, indicating the connection confirming process, in the packet code (transaction code) 503 which defines the transaction, the packet can be prepared by merely setting a broadcasting-indicating code in the target node ID 501 and an address register indicating the control command in the register address 504. In this case the addition of data in the payload is no longer necessary, so that the data amount of the transmission packet can be reduced.

Figure 7:
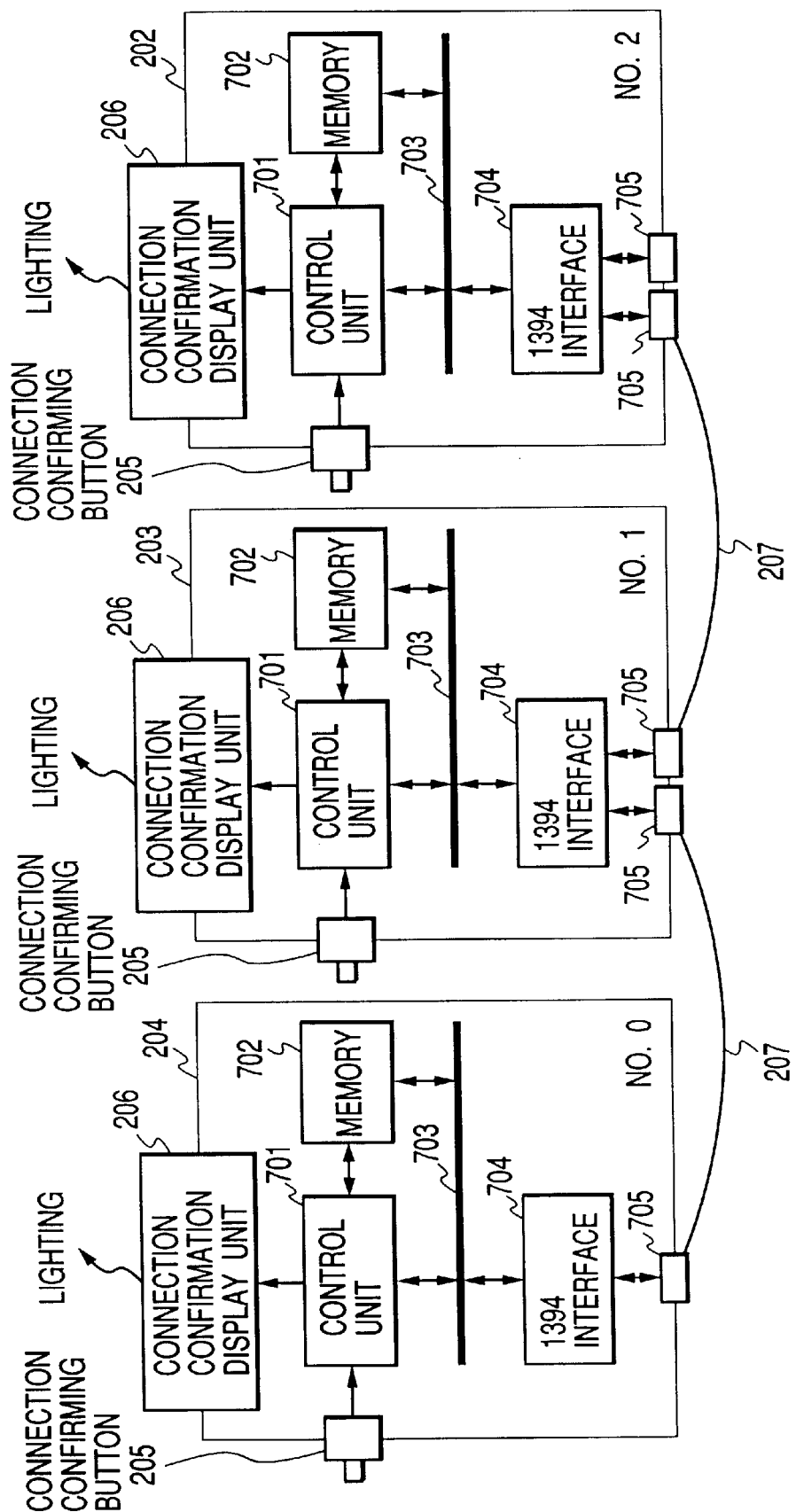
FIG. 7 is a block diagram showing the configuration of a digital data communication apparatus in the first embodiment.
Figure 8:
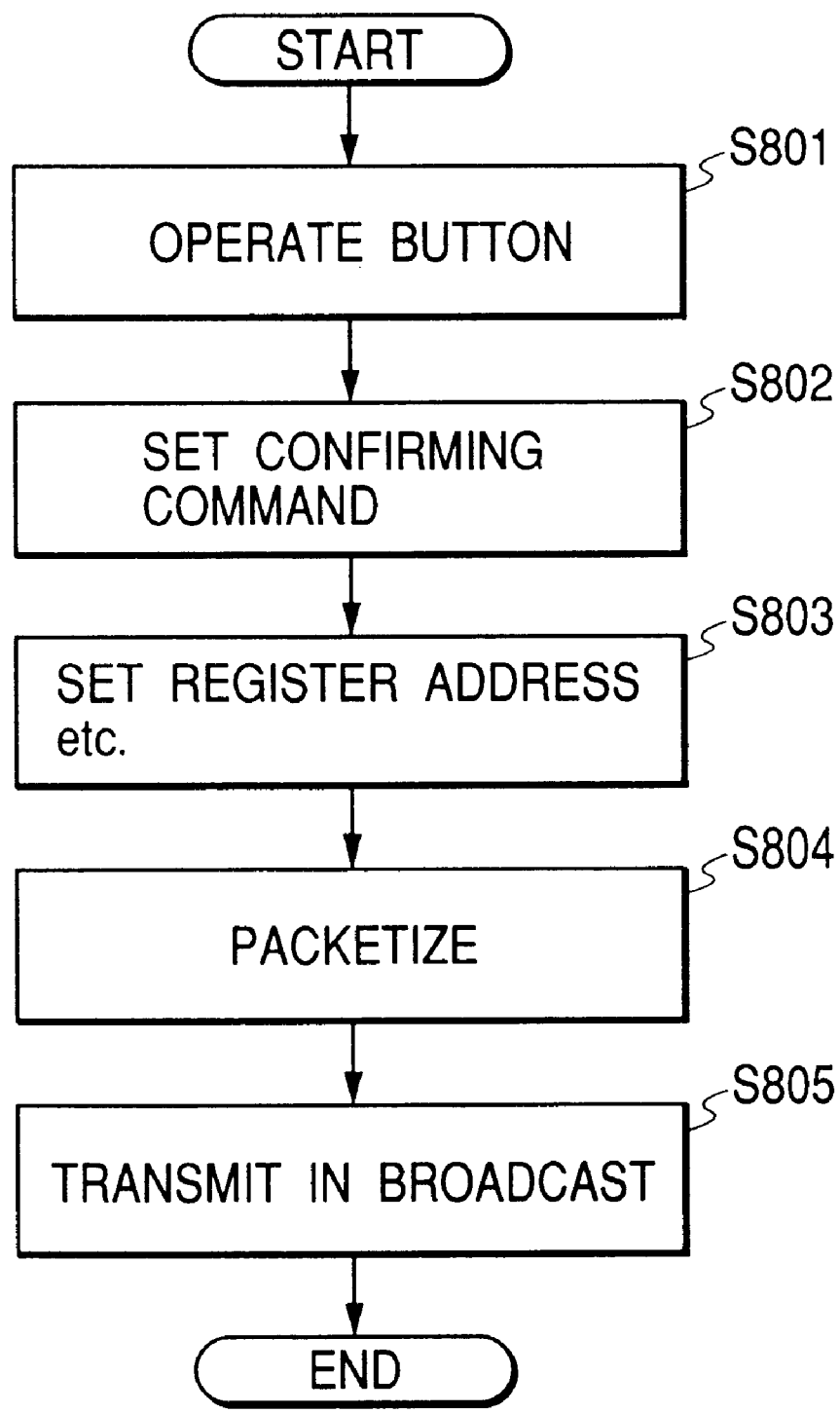
FIG. 8 is a flow chart showing a connection confirming process in a transmitting node.
Figure 9:
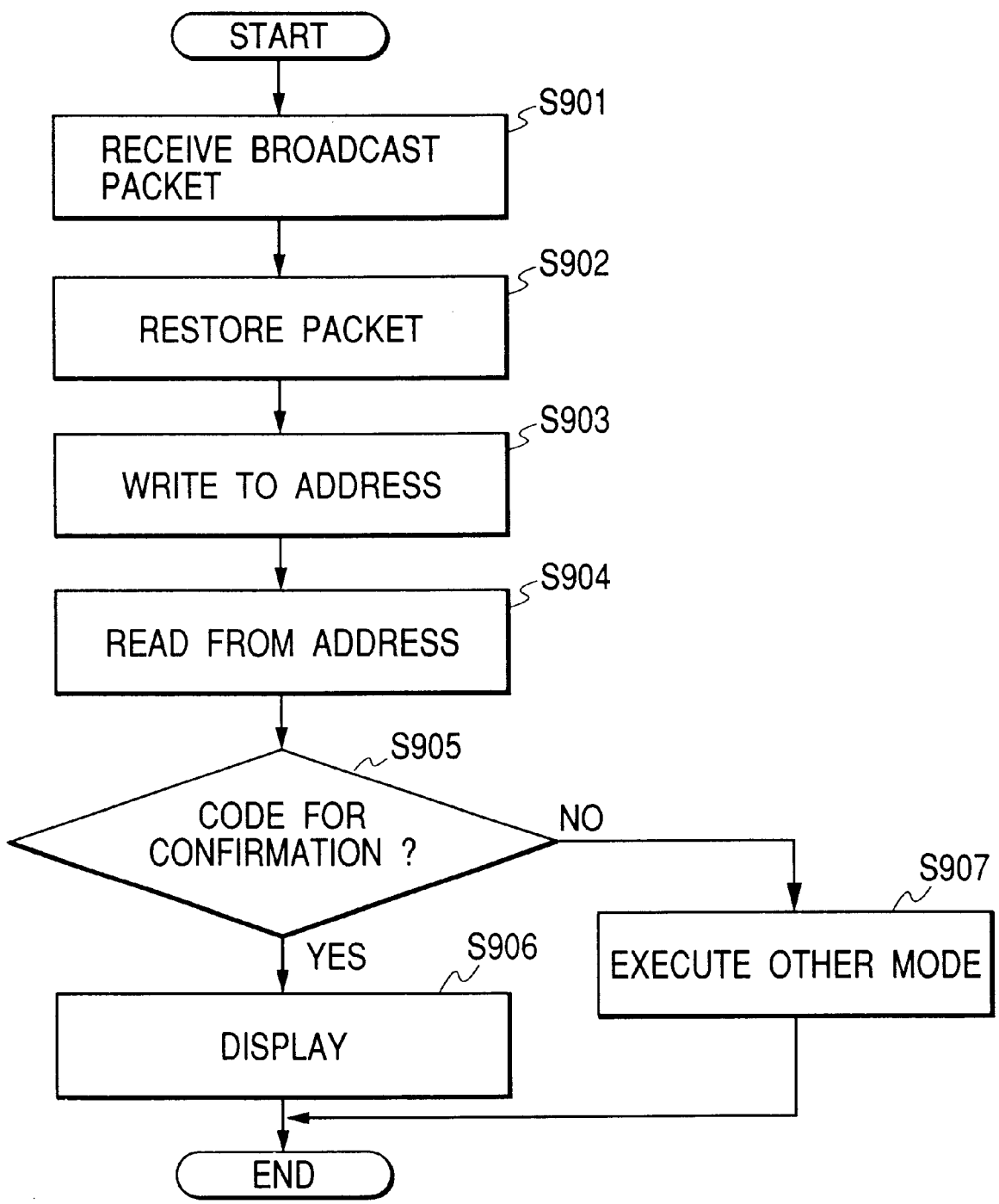
FIG. 9 is a flow chart showing a connection confirming process in a target node.

FIG. 7 shows a bus system reconstructed by detaching the printer 210 from the bus system shown in FIG. 2, wherein components equivalent in function to those in FIG. 2 are represented by same numbers, and FIGS. 8 and 9 are flow charts showing the functions of the transmitting node and the target node.

Referring to FIG. 7, there are provided nodes DVTR-B 204, DVTR-A 203 and PC 202 from left to right, which are respectively given node ID's No. 0, No. 1 and No. 2. There are also provided connection confirming display units 206; control units 701; connection confirming buttons 205; memories 702; internal buses 703; 1394 interfaces 704 based on the IEEE 1394 standard; connection terminals 705 based on the IEEE 1394 standard; and communication cables 207.

Referring to FIG. 7, when the user actuates the connection confirming button 205 of the node No. 0 (DVTR-B 204) (step S801), the node of the node ID No. 0 becomes the transmitting node while the nodes of the node ID's Nos. 1 and 2 become the target nodes. After the actuation of the connection confirming button 205, the control unit 701 of the transmitting node reads the connection confirming command or code from the memory 702 and sends it to the 1394 interface 704 (step S802).

The 1394 interface 704 sets, for designating the target nodes (nodes Nos. 1 and 2) as the destination, a register address defined in the IEEE 1212 standard and a broadcasting code defined in the IEEE 1394 standard (step S803), and effects packetizing into a transmission packet for the asynchronous or isochronous transfer mode (step S804).

Then the 1394 interface 704 converts the transmission packet, generated in the step S804, into a bit stream and transmits it in a serial manner to all the nodes 201–204 present on the bus, through the connection terminal 705 and the communication cables 207 (step S805).

The target nodes of the node ID's Nos. 1 and 2 receive the packet broadcast from the transmitting node (step S901), and the 1394 interface 704 thereof executes a restoration process for the received packet according to the IEEE 1394 standard (step S902).

The control unit 701 of each of the node 1 (node ID No. 1) and the node 2 (node ID No. 2) extracts packet information (including the control command and the transaction code) from the received packet, and writes such packet information in a specified address, defined in the IEEE 1394 standard, in the memories 702 (step S903).

The control unit 701 then reads the packet information written in the specified address of the memory 702 (step S904) and discriminates whether the content of such packet information is a connection confirming command or code (step S905). If the step S905 identifies that the content is a control confirming command or code, the control unit 701 causes the connection confirming display unit 206 to execute display by lighting or blinking (step S906).

On the other hand, if the step S905 identifies that the content is not a control confirming command or code, the control unit 701 effects control to execute another mode (step S907).

The user can confirm the connection state among the nodes by executing the above-explained operation in each node on the bus system, and can also confirm, in case of a defective connection on the bus system, the location of such defective connection between the nodes.

Table 1 shows a connection confirming matrix, summarizing the results of the connection confirming operations on the nodes shown in FIG. 7.

TABLE 1

| Case | Display node 0 | Display node 1 | Display node 2 | Connection state | Confirmation of defect |
|---|---|---|---|---|---|
| 1 | button ON | – | – | defect between nodes 0 & 1 | confirmation needed from nodes 1 & 2 |
| 2 | button ON | + | – | OK between nodes 0 & 1 | confirmed |
| 3 | button ON | + | + | all nodes OK | confirmed |
| 4 | + | button ON | + | all nodes OK | confirmed |
| 5 | + | button ON | – | defect between nodes 1 & 2 | confirmed |
| 6 | – | button ON | + | defect between nodes 0 & 1 | confirmed |
| 7 | – | – | button ON | defect between nodes 1 & 2 | confirmation needed from nodes 0 & 1 |
| 8 | – | + | button ON | defect between nodes 0 & 1 | confirmed |
| 9 | + | + | button ON | all nodes OK | confirmed |

The user can specify the location of the defect between the nodes by judging the state of the bus system shown in FIG. 7, among the cases 1 to 9 in Table 1. FIG. 7 and Table 1 show a case of the bus system composed of three nodes, but the basic confirming procedure remains same even in case the number of the nodes becomes larger than three.

As explained in the foregoing, according to the first embodiment of the present invention, each node receiving the connection confirming packet, which is transmitted from a specified node to all the nodes present on the bus system, displays the result of confirmation of the connection to the user, whereby the user can easily confirm the connection state among the nodes. The user can also confirm the location of abnormality in the connection between the nodes, by a simple method.

Second Embodiment

The first embodiment of the present invention is so constructed that the connection confirming button and the connection confirming display unit are provided in each of the node present on the bus system, and the connection confirming display unit of the node, which have properly received the connection confirming packet broadcast from a specified node, is turned on or blinks. It is however also possible, as in a second embodiment of the present invention to be explained in the following, to provide certain predetermined ones only of the nodes with the connection confirming buttons and to allow the user to confirm the connection state of the specified nodes designated by the user.

Figure 10:
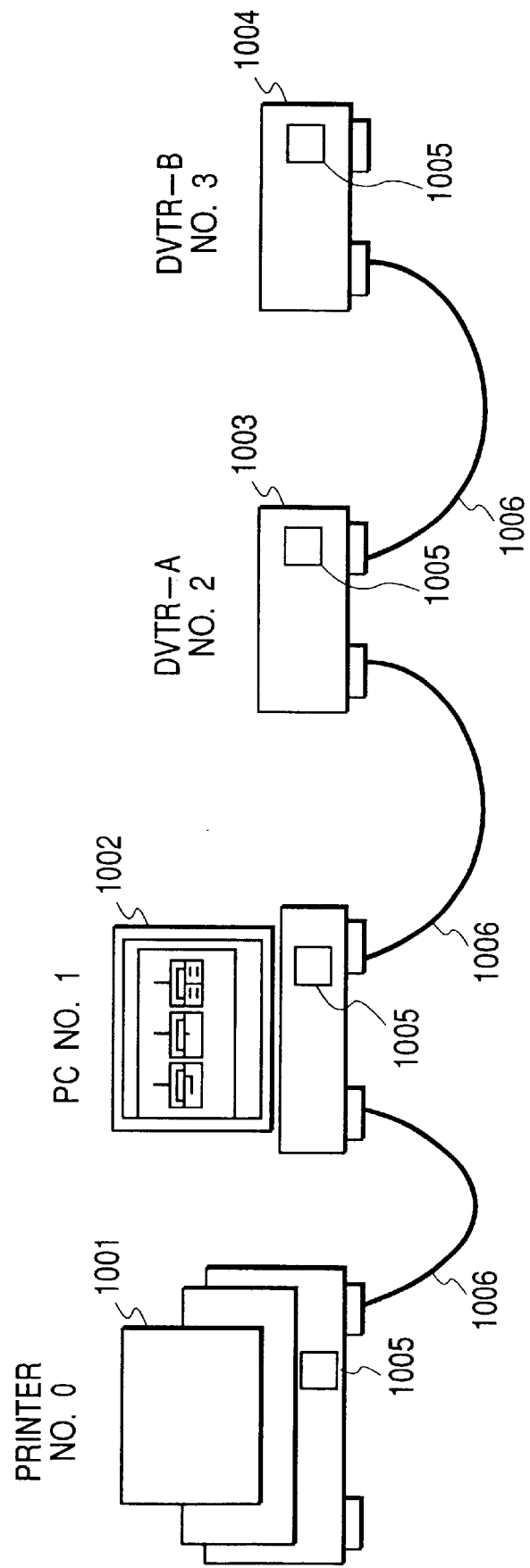
FIG. 10 is a view showing the configuration of a bus system in a second embodiment of the present invention.

FIG. 10 shows a bus system composed by connecting plural digital data communication apparatus (hereinafter called nodes) equipped with 1394 interfaces. This bus system executes communication by a communication method based on the IEEE 1394 standard.

In FIG. 10, there are shown a printer 1001; a personal computer (PC) 1002; a first digital video tape recorder (DVTR-A) 1003; a second digital video tape recorder (DVTR-B) 1004; a connection confirming display unit 1005 provided in each of the nodes 1001–1004; and a communication cable 1006.

The bus system composed of the plural nodes as shown in FIG. 10 executes, after the bus resetting, automatic assignment of the node ID's (physical addresses) according to the connection configuration of the nodes.

As an example, in the configuration shown in FIG. 10, a node ID "No. 0" is assigned to the printer 1001, "No. 1" to the PC 1002, "No. 2" to the DVTR-A 1003, and "No. 3" to the DVTR-B 1004. The node ID's of the nodes are assigned according to a procedure based on the IEEE 1394 standard.

The PC 1002 has a function of managing the connection relationship of the nodes on the system, namely the function of the bus manager defined under the IEEE 1394 standard. By this function, the PC 1002 can prepare topology map information indicating the connection relationship among the nodes, and, utilizing this information, can present the connection relationship among the nodes to the user.

In the bus system based on the IEEE 1394 standard, the connection relationship among the nodes is recognized as a mother-daughter relationship. The PC 1002, constituting the bus manager, collectively manages the information (topology map information) relating to such mother-daughter relationship of the nodes. Also each node on the bus system can recognize the connection relationship of the bus system by utilizing the topology map information managed by the PC 1002. In the present embodiment, there will be explained a case where the PC 1002 displays the topology of the nodes physically connected to the bus, utilizing the topology map information.

Figure 11:
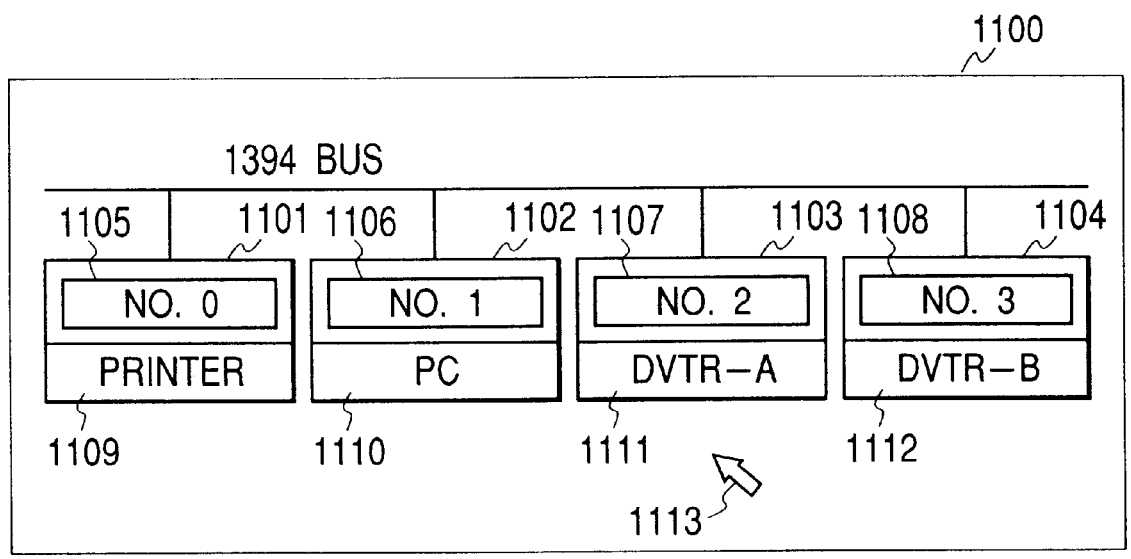
FIG. 11 is a view showing an example of the image display field of a monitor 1100 provided in the PC1002.

FIG. 11 shows an example of the image display on a monitor 1100 provided in the PC 1002. In the present embodiment, the PC 1002 constitutes a control node which instructs the confirmation of the connection state of specified nodes.

In FIG. 11, numerals 1101–1104 are icons indicting the nodes connected to the bus system shown in FIG. 10, wherein 1105–1108 indicate the node ID' of such nodes and 1109–1112 indicate the device names thereof. The node ID and the device name are displayed on the icon of each node. A numeral 1113 indicates pointing means (for example an arrow pointer operable with a mouse) for pointing the icons 1101–1108 displayed on the monitor 1100.

The bus system normally executes communication among the nodes, utilizing the node ID's to be set in the bus initialization process after the bus resetting. Each node recognizes nodes on the bus system by the node ID's thereof, but, in order to identify the kind of the node which becomes the partner in communication, has to inquire the equipment information (including the device name) of such node.

In the following there will be explained, with reference to FIGS. 12 to 14, a process executed by the PC 1002 for inquiring the equipment information of the node present on the bus system and correlating the equipment information with the node ID.

Figure 12:
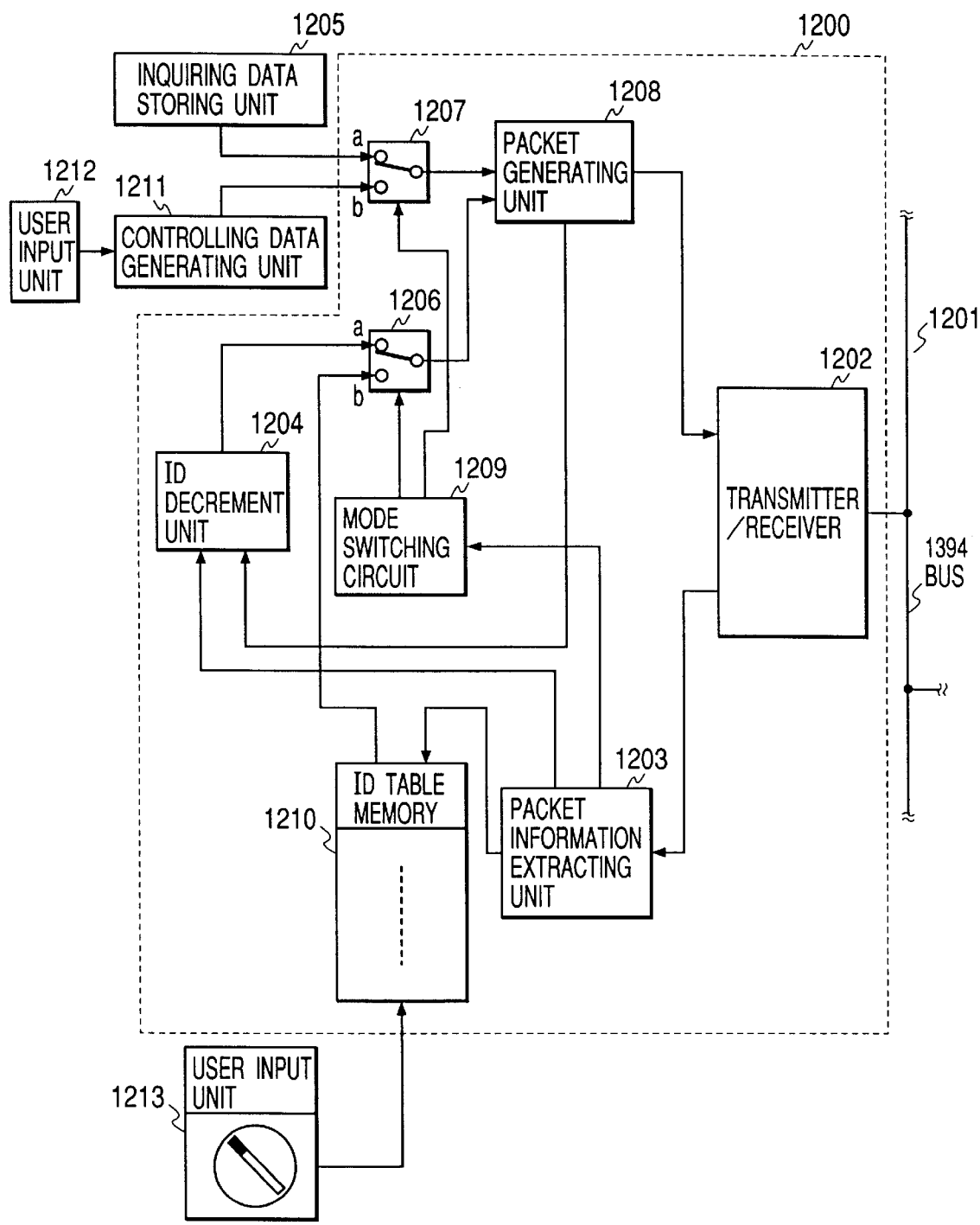
FIG. 12 is a block diagram showing the configuration of a 1394 interface provided in the PC1002.
Figure 13:
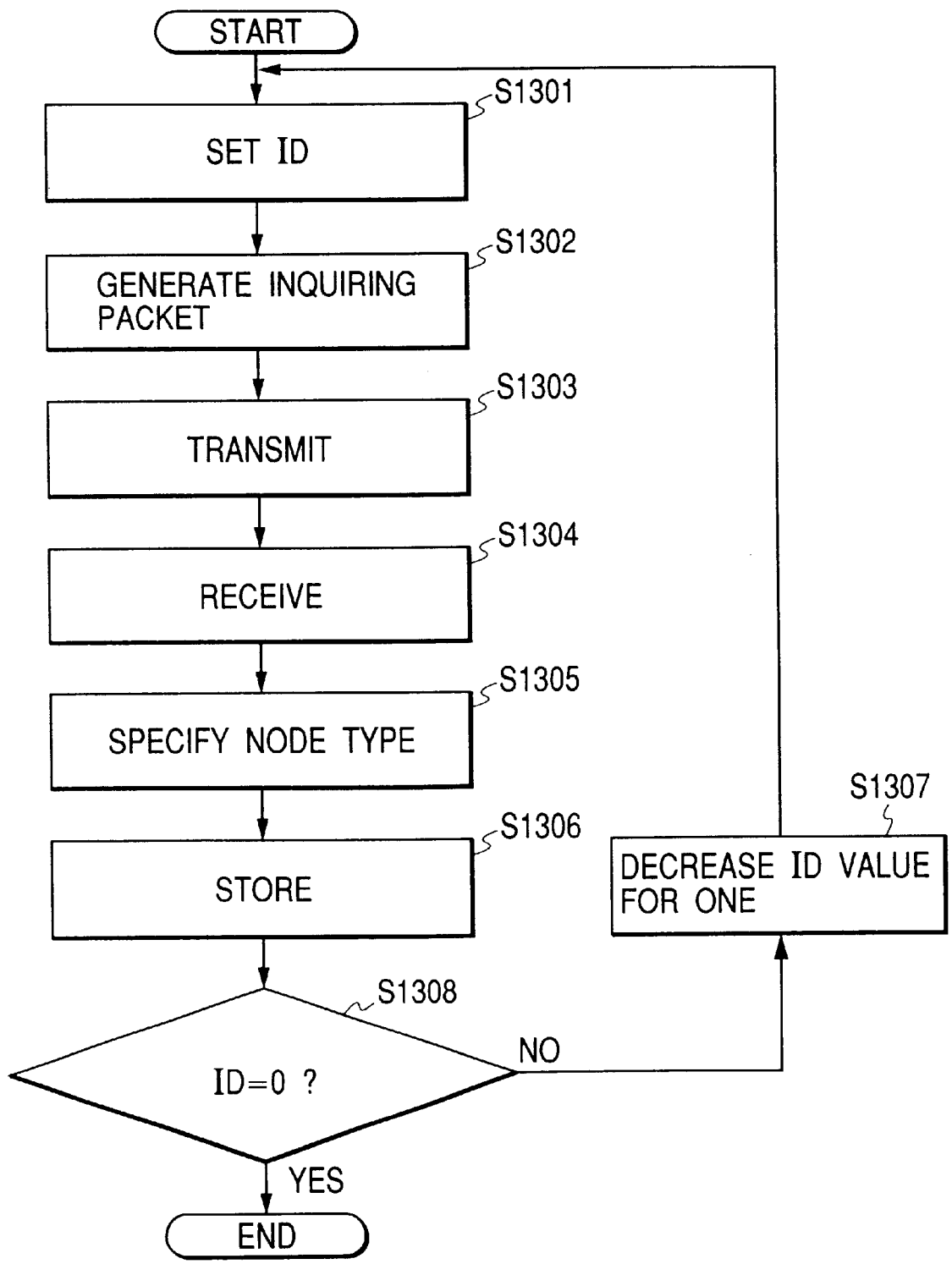
FIG. 13 is a flow chart showing an equipment information inquiry process in a 1394 interface 1200.

FIG. 12 is a block diagram showing the configuration of the 1394 interface provided in the PC 1002, and FIG. 13 is a flow chart showing the equipment information inquiring process in the 1394 interface 1200.

Referring to FIG. 12, the 1394 interface 1200 is provided with a data switch 1207, an ID switch 1206 and a mode switching circuit 1209 for selecting these switches. After the bus initialization process, the mode switching circuit 1209 shifts both the data switch 1207 and the ID switch 1206 to terminals at a side a. The data switch 1207 selects the output either from an inquiry data storage unit 1205 (for releasing a control command for inquiring the equipment information of the node) or from a control data generation unit 1211. The ID switch 1206 selects the output either from an ID decrement unit 1204 or from an ID table memory 1210. The mode switching circuit 1209 does not shift the switches 1206, 1207 until the equipment information is inquired to all the nodes.

Upon completion of the bus initialization process (auto recognition process for the connection configuration and node ID setting for all the nodes) after the bus resetting (step S1301), the root node DVTR-B 1004 in FIG. 10) broadcasts a cycle start packet (indicating the start of each communication cycle, and matching the time in all the nodes). A transmitter/receiver unit 1202 receives the cycle start packet transmitted on the bus 1201, and sends this packet to a packet information extraction unit 1203.

The packet information extraction unit 1203 reads a source ID contained in the entered cycle start packet, namely the node ID of the root node, and sends it to the ID decrement unit 1204. The ID value sent to the ID decrement unit 1204 is the node ID or the root node and is therefore largest among the node ID's of the nodes connected to the bus 1201.

For example, in case five nodes are connected to the bus 1201, the nodes are given successive node ID's of Nos. 0, 1, 2, 3 and 4. Consequently an ID value "4" is sent, as the ID of the root node, to the ID decrement unit 1204. In case the PC 1002 itself becomes the root node, it causes a packet generation unit 1208 to transmit the cycle start packet to the bus 1201 and sends an ID value, smaller by one than the ID value of the PC 1002, to the ID decrement unit 1204.

Then the 1394 interface 1200 executes a process for inquiring the equipment information of the nodes connected to the bus 1201. The node ID released from the ID decrement unit 1204 is entered through the ID switch 1206 into the packet generation unit 1208. At first the largest ID value on the bus 1201 (however an ID value smaller by one than the self node ID in case of the root node) is sent to the packet generation unit 1208.

The packet generation unit 1208 also receives a control command (for inquiring the equipment information) stored in the inquiry data storage unit 1205. The packet generation unit 1208 generates an inquiry packet which contains the node ID, entered through the ID switch 1206, in the address ID field, the control command entered through the data switch 1207 in the data field and the self node ID in the source ID field (step S1302). This packet is transferred onto the bus 1201 through the transmitter/receiver unit 1202, in the asynchronous transfer mode (step S1303). A node receiving the inquiry packet (namely node indicated by the address ID) generates a response packet including the equipment information of such node and asynchronously transfers the response packet to the source node of the inquiry packet.

Receiving the response packet, the transmitter/receiver unit 1202 sends it to the packet information extraction unit 1203 (step S1304), which in response extracts the equipment information and the source ID contained in the response packet and converts the equipment information into a predetermined code (indicating the kind of the node) (step S1305). Then the packet information extraction unit 1203 stores the code and the source ID in combination into the ID table memory 1210 (step S1306).

After the above-explained process, the ID decrement unit 1204 supplies the packet generation unit 1208 with a new ID value, obtained by decrement by one of the currently set ID value (step S1307). Thus, an inquiry packet is sent, as explained in the foregoing, to the node indicated by the new ID value, and the code and the node ID obtained from the resulting response packet are stored in the ID table memory 1210. This process is repeated, except for the self ID value, until a state ID=0 is reached, whereby the equipment information of the node corresponding to each ID value is stored, in combination with the node ID, in the ID table memory 1210 (step S1308).

FIG. 14 shows an example of the data stored in the ID table memory 1210, wherein an area 1401 stores ID values (or node ID's) in the order of output from the ID decrement unit 1204, while an area 1402 stores the equipment information contained in the response packets from the nodes, after conversion into predetermined codes.

In the example shown in FIG. 14, the codes are defined as 001000 for the DVTR-A, 001001 for the DVTR-B and 000000 for the printer. In the present embodiment, the upper three digits of the code indicate the device name, while the lower three digits indicate the serial number within the nodes of a same device name.

In this manner the 1394 interface 1200 inquires the equipment information of all the nodes, other than itself, connected to the bus 1201 and stores such information in the ID table memory 1210. The self node ID is unnecessary and is therefore not stored in the ID table memory 1210. The above-explained process is executed after every bus resetting.

Then there will be explained a process in case the 1394 interface 1200 executes communication with a specified node.

After the inquiry of the equipment information of all the units on the bus system and the storage of the results in the ID table memory 1210 in the above-explained process, the mode switching circuit 1209 shifts the data switch 1207 and the ID switch 1206 to second terminals (side b).

The terminal b of the data switch 1207 receives control data (for example a connection confirming command) generated by the control data generation unit 1211 according to the designation by a user input unit 1212 of the PC 1002, and such control data are supplied to the packet generation unit 1208.

On the other hand, the terminal b of the ID switch 1206 receives an ID value selected from the ID table memory 1210. The selection of the content of the ID table memory 1210 is executed by the designation of a code indicating the kind of the node or an icon linked therewith, by the user input unit 1212 of the PC 1002.

In this manner the PC 1002 can correlate the device names of the nodes with the node ID's after every bus resetting. These information and the topology map information may also be used for displaying the connection configuration of the bus system in correlation with the device names.

Referring to FIG. 11, the user points any of the icons 1101–1104 of the nodes, displayed on the monitor of the PC 1002, with the pointing means 1113, whereby the PC 1002 confirms the connection of the node pointed by the user. As an example, in case the icon 1104 is pointed on the monitor 1100 of the PC 1002, the PC 1002 executes confirmation of the connection for the DVTR-B 1004 corresponding to the node ID No. 3. If the DVTR-B 1004 is properly connected, the connection confirming display unit 1005 thereof provides a display easily recognizable by the user, by being lighted or blinking. Such display allows the user to recognize the position of the pointed node.

In the foregoing, in confirming the connection with the PC 1200, the connection confirming display unit of each node is assumed to provide display by lighting or blinking, but it may instead provide a voice display or a message display with a liquid crystal panel. Also in case the connection the PC 1002 is not confirmed, the confirming node may indicate the absence of confirmation by the display of a message "no connection" on the monitor. Furthermore, as the user can confirm the physical positional relationship of the nodes through confirmaiton of connection of the nodes on the monitor image of the PC 1002, it is also possible, for example, to move the icons 1101–1104 on the monitor display so as to correspond to the actual arrangement of the equipment.

Figure 15:
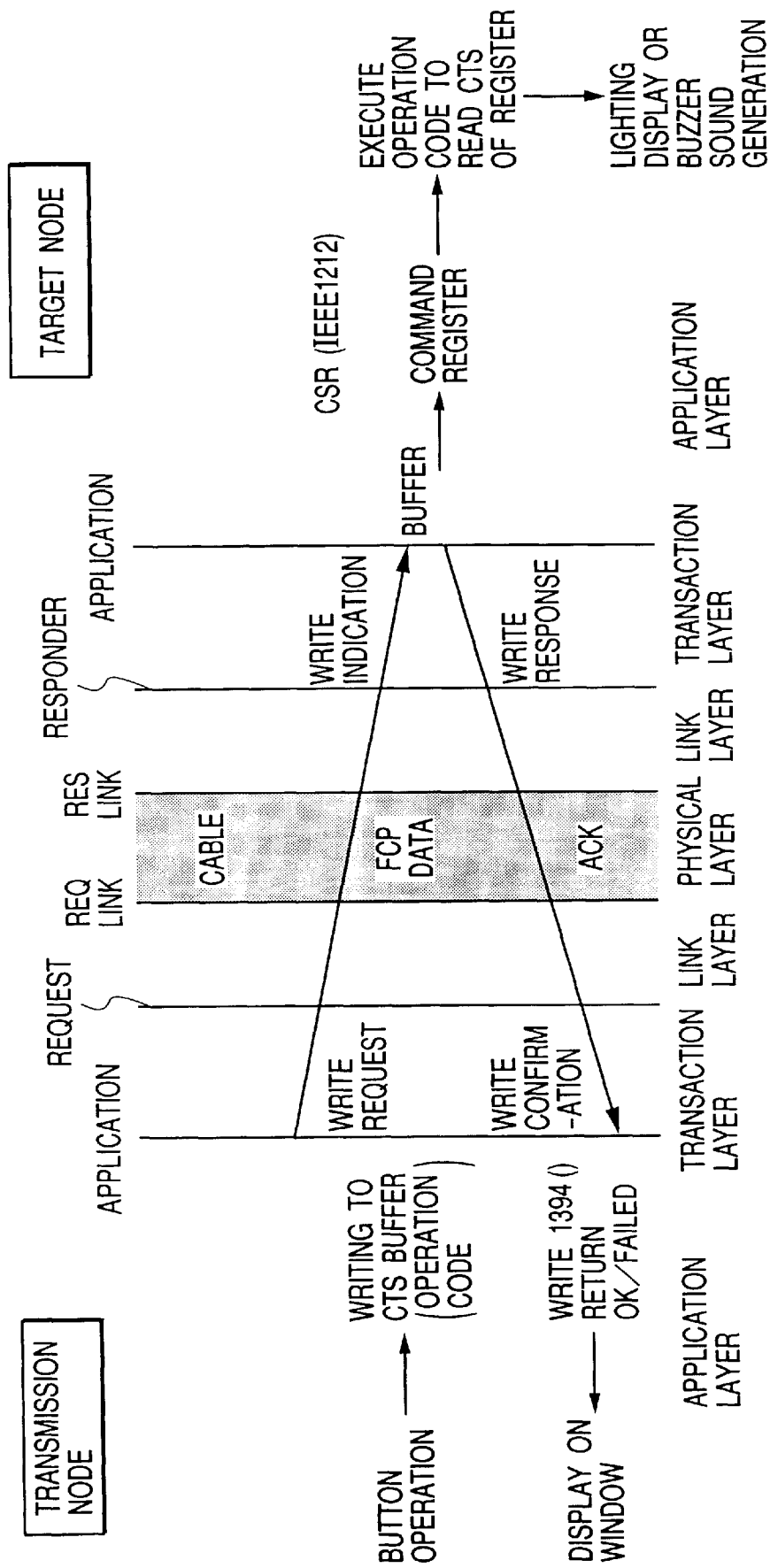
FIG. 15 is a view showing a connection confirming transaction process in the second embodiment.

FIG. 15 is a view showing a connection confirming transaction process based on the IEEE 1394 standard, representing a connection confirming transaction from the actuation of the connection confirming button (pointing means 1113) of the transmitting node to the display of the result by the connection confirming display unit 1005 of the target node. The basic transaction is based on the IEEE 1394 standard and will not be explained in detail.

In FIG. 15, the left-hand side shows the flow of operations in the transmitting node (in which the user instructs the confirmation of connection state), while the right-hand side shows the flow of operations in a target node (which indicates the connection state to the user). The central part shows layers of the 1394 interfaces provided in the transmitting node and in the target node, and vertical lines indicate the boundaries of the layers.

The 1394 interface in each node is composed of a physical layer, a link layer, a transaction layer and an application layer (cf. FIG. 4).

When the pointing means 1113 of the transmitting node is actuated, it generates a connection confirming packet for confirming the connection of each target node. The connection confirming packet is transmitted, by asynchronous transfer, to a target node designated by the pointing means 1113. The target node receives the connection confirming packet and executes a connection confirming command contained therein, thereby effecting a display for confirming the connection, utilizing the connection confirming display unit 1005.

Also in response to the reception of the connection confirming packet, the target node may transmit a response indicating the reception to the transmitting node, whereby it is rendered possible to effect a display, indicating that the connection with the target node is confirmed, on the transmitting node.

The configuration of the connection confirming packet in the second embodiment will be explained with reference to FIG. 5, which indicates the configuration in the asynchronous transfer mode. The configuration of the asynchronous transfer packet is based on the IEEE 1394 standard and will not be explained in detail.

In generating the connection confirming packet in the asynchronous transfer mode, the transmitting node sets the ID of the target node designated by the pointing means 1113 in the target node ID 501 of the packet header and also sets a connection confirming command 502 in the payload.

In the asynchronous transfer mode, by setting in advance a code, indicating the connection confirming process, in the packet code (transaction code) 503 which defines the transaction, the packet can be prepared by merely setting the node ID of the target node in the target node ID 501 and a register address indicating the control command in the register address 504. In this case the addition of data in the payload is no longer necessary, so that the data amount of the transmission packet can be reduced.

Figure 16:
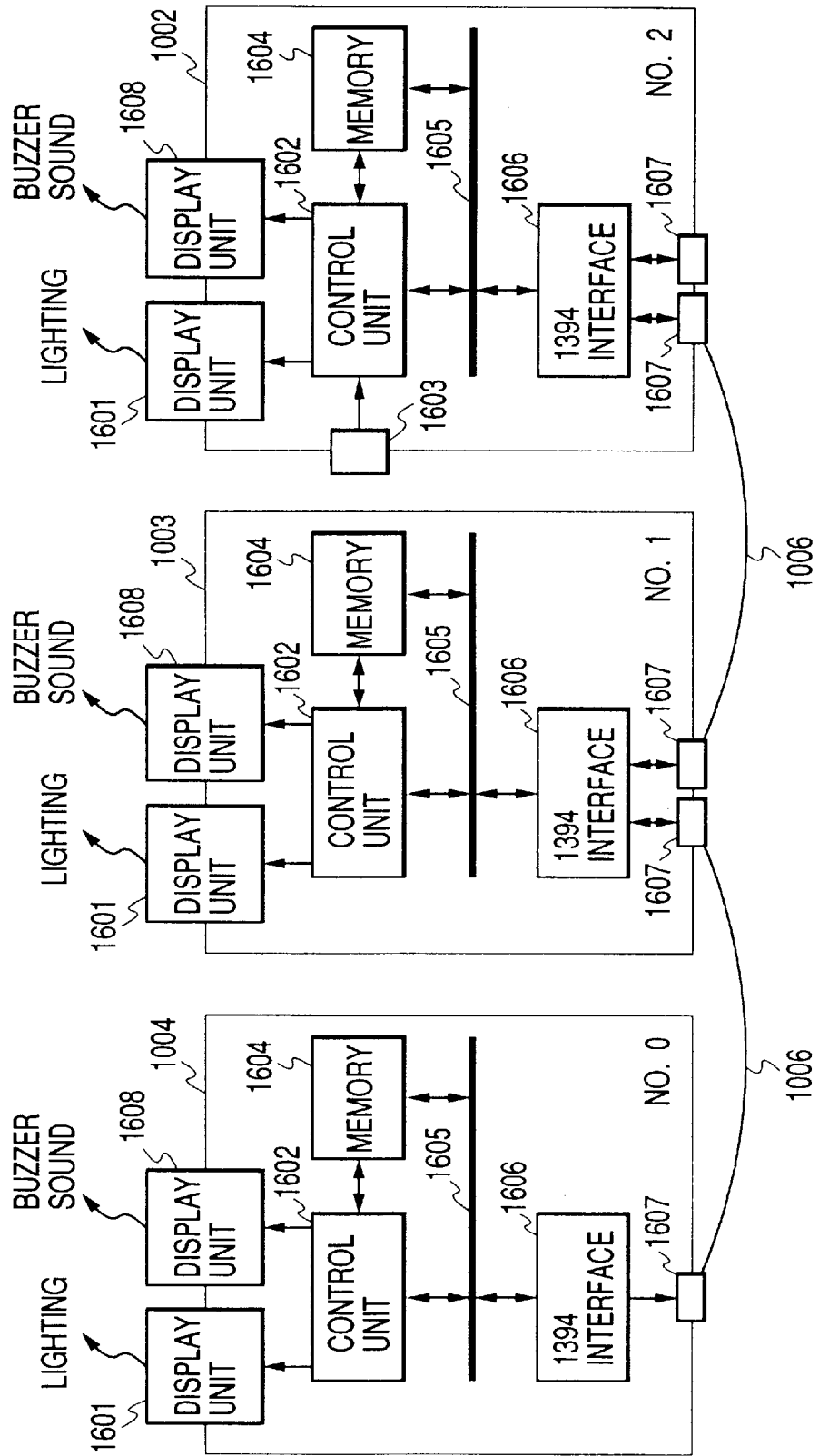
FIG. 16 is a block diagram showing the configuration of a digital data communication apparatus in the second embodiment.

FIG. 16 shows a bus system reconstructed by detaching the printer 1001 from the bus system shown in FIG. 10, wherein nodes DVTR-B 1004, DVTR-A 1003 and PC 1002 from left to right are respectively given node ID's No. 0, No. 1 and No. 2. There are also provided display units 1601 for confirming the connection by lighting or blinking; control units 1602; a pointing unit 1603 for designating a node for which the connection is to be confirmed; memories 1604; internal buses 1605; 1394 interfaces 1606 based on the IEEE 1394 standard; communication cables 207; and display unit 1608 for displaying the confirmation of the connection by a voice message. The 1394 interface 1606 is so constructed as to include the 1394 interface 1200 shown in FIG. 12.

The PC 1002 constituting the transmitting node (node No. 2) designates the DVTR-A (node No. 1) or the DVTR-B (node No. 2) as the target node, according to the operation of the pointing unit 1603. After the operation of the pointing unit 1603, the control unit 1602 of the transmitting node reads the connection confirming command from the memory 1604 and enters such command into the 1394 interface 1605.

For designating the target node constituting the destination of communication, the 1394 interface 1605 sets the node ID of the target node defined by the IEEE 1394 standard, and effects packetization of the transmission packet for the asynchronous transfer mode.

Then the 1394 interface 1606 converts the generated transmission packet into a bit stream and transmits it in a serial manner to the target node present on the bus, through the connection terminal 1607 and the communication cable 1006.

The target node receives the packet transferred in the asynchronous transfer mode from the transmitting node, and the 1394 interface 1606 thereof executes a restoration process for the received packet according to the IEEE 1394 standard.

The control unit 1602 of the target node extracts packet information (including the control command and the transaction code) from the received and restored packet, and writes such packet information in a specified address, defined according to the IEEE 1394 standard, in the memories 1604.

The control unit 1602 then reads the packet information written in the specified address of the memory 1604 and discriminates whether the content of such packet information is a connection confirming command or code. If the result of discrimination indicates that the content is a control confirming command or code, the display unit 1601 provides a display by lighting or blinking while the display unit 1608 provides a display by voice.

The user can confirm the connecting positions of each node by executing the above-explained operation in each of the target nodes (node ID's Nos. 1 and 2).

Figure 17:
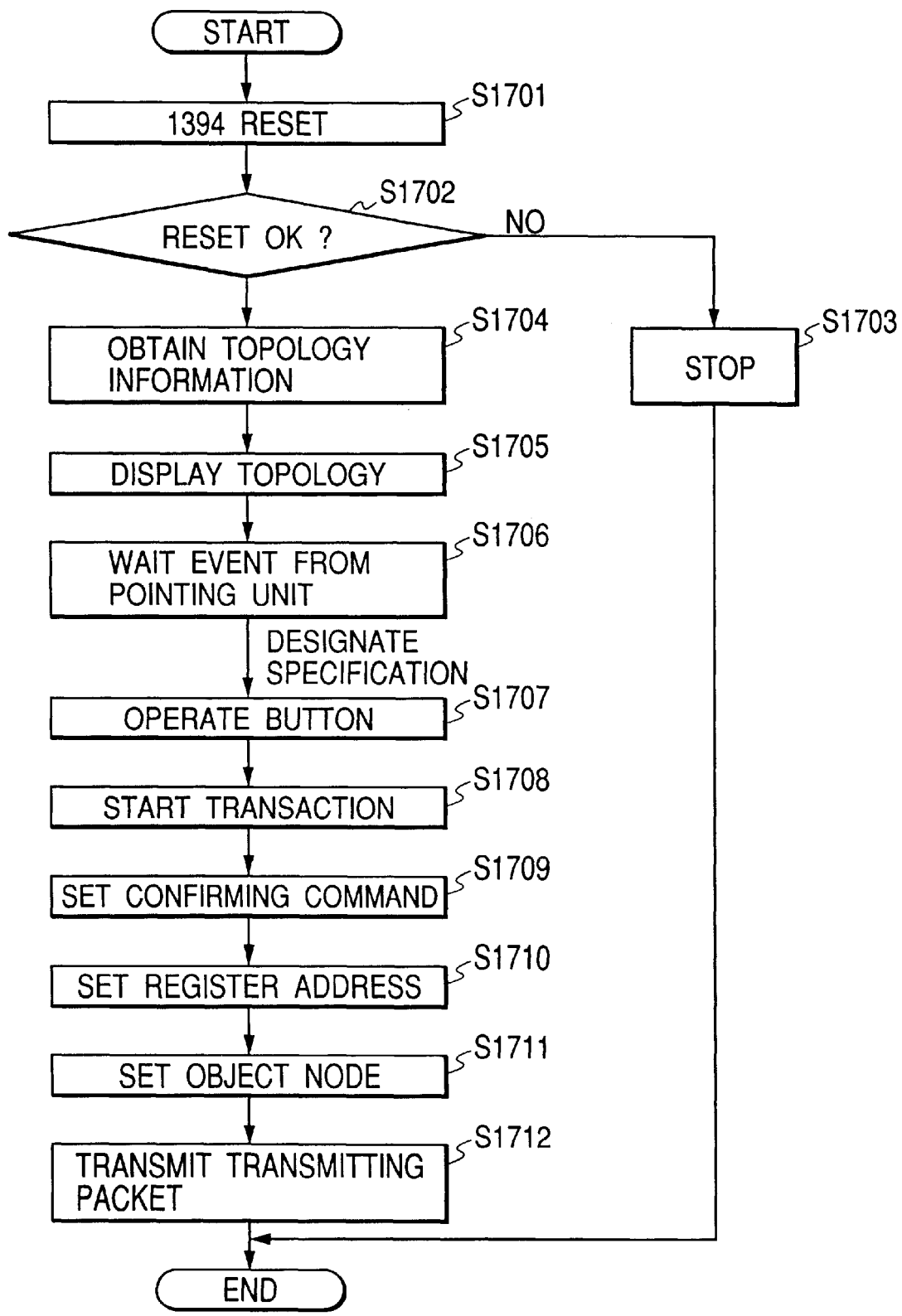
FIG. 17 is a flow chart showing a connection confirming process in a transmitting node.
Figure 18:
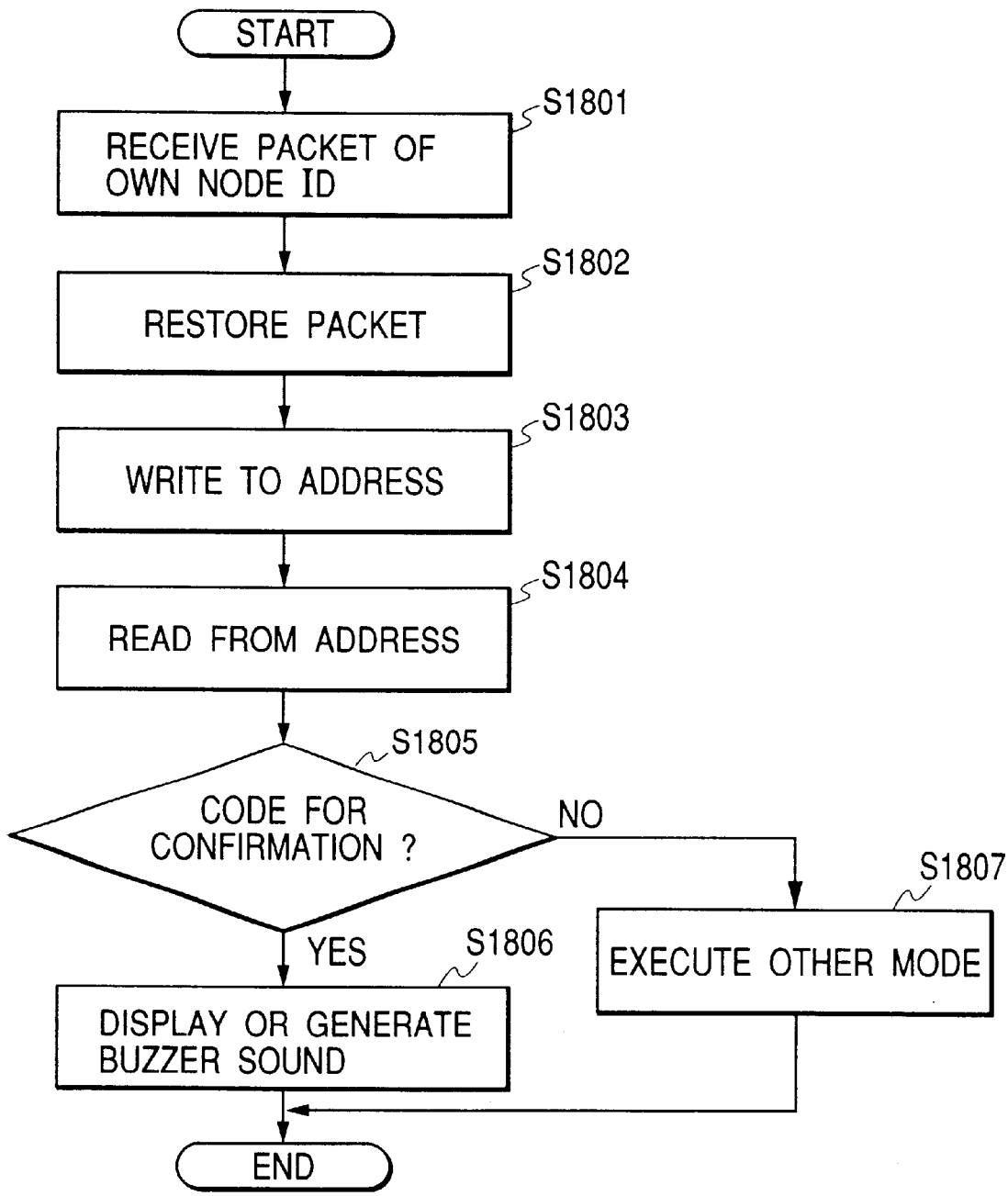
FIG. 18 is a flow chart showing a connection confirming process in a target node.

FIGS. 17 and 18 are flow charts showing the functions of the transmitting node (PC 1002) and the target node (DVTR-A 1003 or DVTR-B 1004) in the second embodiment.

After a bus resetting in the bus system, the nodes execute, as shown in FIG. 17, the recognition of the connection configuration and the assignment of the node ID's (step S1701).

Then the transmitting node discriminates whether the bus initialization process after the bus resetting has been properly completed (step S1702), and, if not, the sequence proceeds to a step S1703 to terminate this procedure.

On the other hand, in case the bus initialization is properly completed, the sequence proceeds to a step 1704 to acquire the topology map information and the equipment information. Then a step S1705 displays the topology and the device name acquired in the step S1704.

Then a next step S1706 awaits an event from the pointing means 1603. When the user designated a node by actuating the pointing means 1603 (step S1707), the transmitting node initiates the connection confirming transaction by the asynchronous transfer mode (step S1708).

Then a step S1709 sets the connection confirming command in the transmission packet, and a step S1710 sets a predetermined register address.

A next step S1711 sets the node ID of the target node in the target node ID of the transmission packet, and transmits the packet to the target node (step S1712).

On the other hand, the target node executes a process shown in the flow chart in FIG. 18. At first a step S1801 receives the packet having a node ID corresponding to the target node. A next step S1802 restores the received packet in the form of a bit stream into the original packet.

A next step S1803 executes a process of writing the data (connection confirming command) of the payload in the received packet, into a predetermined address of the memory 702.

A next step S1804 reads the content of the predetermined address, and a step S1805 discriminates whether the content is a connection confirming command.

If the step S1805 identifies that the content is a connection confirming command, the sequence proceeds to a step S1806 to execute display and generate buzzer sound, thereby visually and acoustically informing the user of the reception of the connection confirming command. In case the step S1805 identifies that the content is not the connection confirming command, there is executed another mode (step S1807).

The foregoing second embodiment displays the topology on the monitor of the PC 1002, but the display may also be realized in the form of a table. Such display cannot show the physical arrangement of the nodes, but provides the convenience of identifying the nodes.

As explained in the foregoing, the second embodiment of the present invention allows, in an equipment displaying the connection relationship of the plural equipment in a system, to easily and simply confirm the connection with a specified equipment by designating an icon or a device name, indicating such specified equipment.

Also the second embodiment of the present invention allows the user to easily correlate the equipment on the display and the actual equipment, by displaying the connection relationship of the plural equipment in the system and designating a specified equipment on the display. Consequently it is rendered possible to avoid erroneous operation in case the equipment of a kind is present in plural units in the system.

Furthermore, as the second embodiment of the present invention can confirm the physical positional relationship of the equipment, based on the display of the connection relationship of the plural equipment, the user is enabled to rearrange the display of the connection relationship of such equipment into a form corresponding to the actual arrangement thereof. Consequently the arrangement on the display can be made similar to the actual arrangement and the troubles resulting from erroneous operations can be prevented.

Third Embodiment

A third embodiment provides another embodiment of the 1394 interface 1200 of the second embodiment shown in FIG. 12. In the third embodiment, components equivalent in function to those in the second embodiment are represented by corresponding numbers, and will not be explained in detail.

Figure 19:
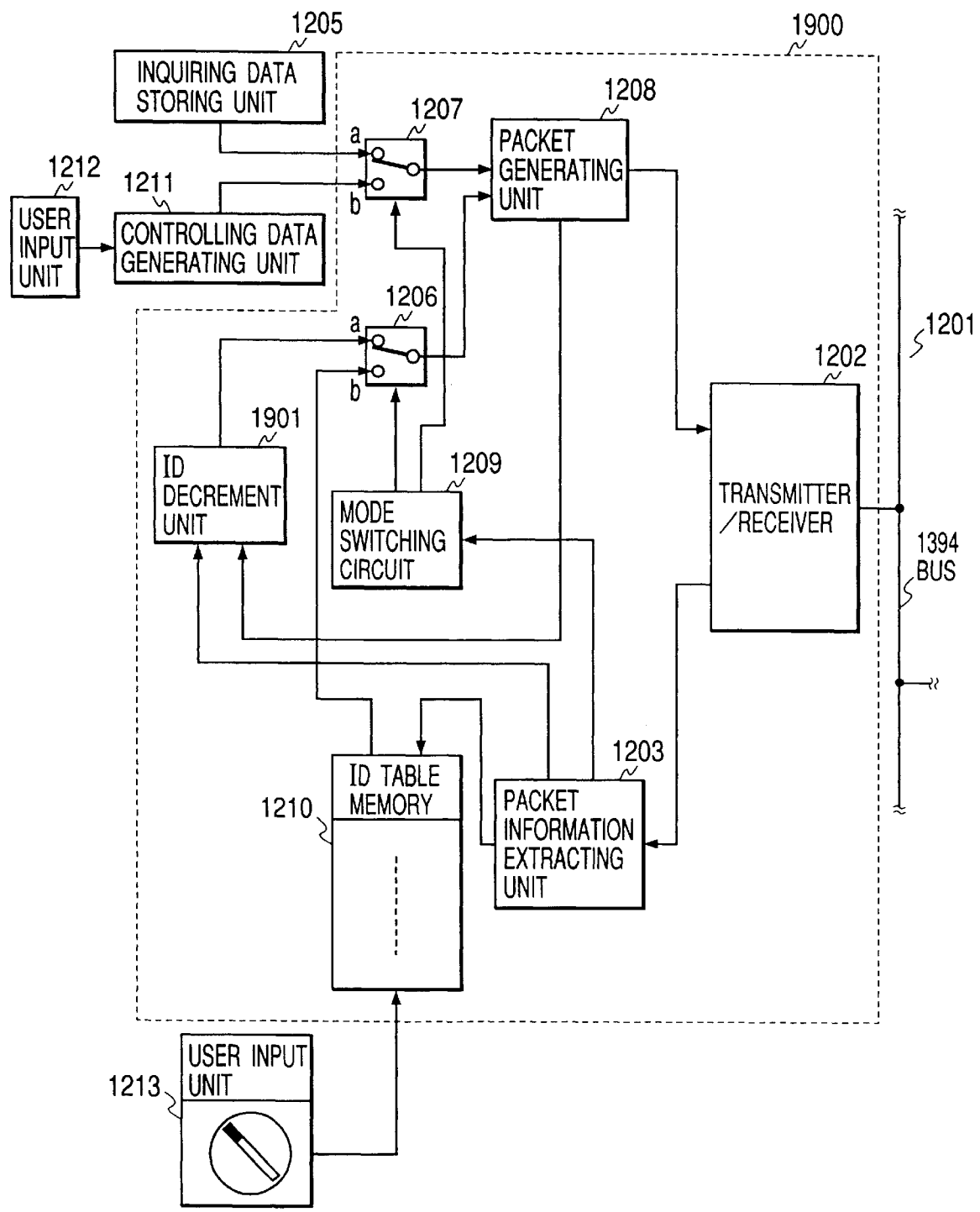
FIG. 19 is a block diagram showing another example of the configuration of the 1394 interface provided in the PC 1002.
Figure 20:
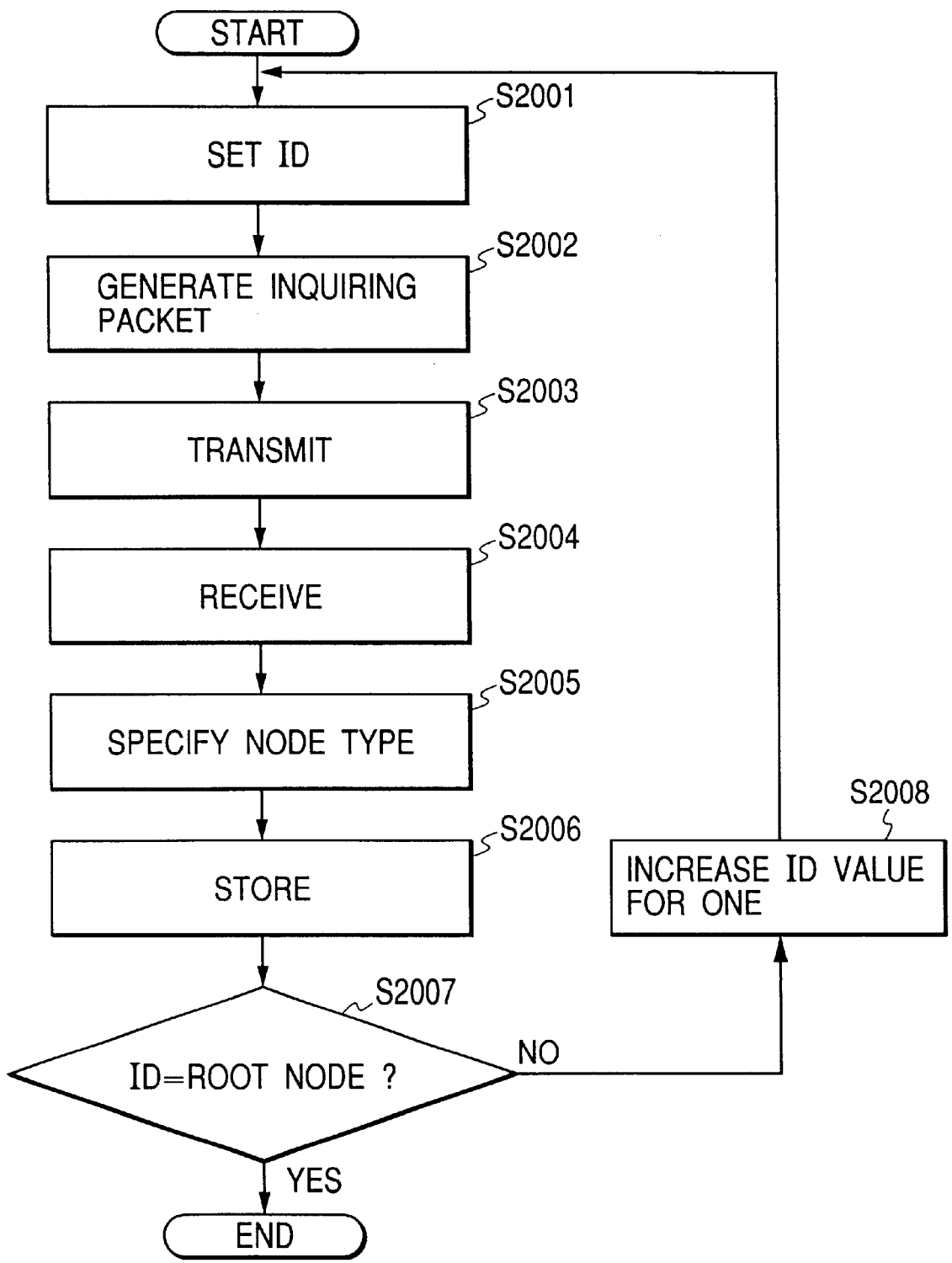
FIG. 20 is a flow chart showing an equipment information inquiry process in the 1394 interface 1900.

FIG. 19 is a block diagram showing another embodiment of the 1394 interface 1900 provided in the PC 1002, and FIG. 20 is a flow chart showing an equipment information inquiring process of the 1394 interface 1900.

Referring to FIG. 19, the terminal a of the ID switch 1209 is connected to an ID increment unit 1901 instead of the ID decrement unit 1204. The ID increment unit 1901 is provided with ID=0 as an initial value (however ID=1 in case the self node ID is No. 0).

After the bus resetting, upon completion of the bus initialization (automatic recognition of the connection configuration and node ID setting for all the nodes) (step S2001), the 1394 interface 1900 executes, as in case of the 1394 interface 1200, a process for inquiring the equipment information of each node.

The packet generation unit 1208 generates the inquiry packet containing the node ID, received through the ID switch 1206, in the address ID field, the control command received through the data switch 1207 in the data field and the self node ID in the source ID field (step S2002), and this packet is asynchronously transferred through the transmitter/receiver unit 1202 to the bus 1201 (step S2003). A node receiving the inquiry packet (namely node indicated by the address ID) generates a response packet including the equipment information of such node and asynchronously transfers the response packet to the source node of the inquiry packet.

Receiving the response packet, the transmitter/receiver unit 1202 sends it to the packet information extraction unit 1203 (step S2004), which in response extracts the equipment information and the source ID contained in the response packet and converts the equipment information into a predetermined code (indicating the kind of the node) (step S2005). Then the packet information extraction unit 1203 stores the code and the source ID in combination into the ID table memory 1210 (step S2006).

After the above-explained process, the ID increment unit 1901 supplies the packet generation unit 1208 with a new ID value, obtained by increment by one of the currently set ID value (step S2007). Thus, an inquiry packet is sent, as explained in the foregoing, to the node indicated by the new ID value, and the code and the node ID obtained from the resulting response packet are stored in the ID table memory 1210. This process is repeated until the node ID of the root node is reached, whereby the equipment information of the node corresponding to each ID value is stored, in combination with the node ID, in the ID table memory 1210 (step S2008).

In this manner the PC 2002 can correlate the device names of the nodes and the node ID's at every bus resetting, as in the foregoing second embodiment. Also such information and the topology map information can be utilized to display the connection configuration of the bus system in correlation with the device names.

Fourth Embodiment

The foregoing second and third embodiments disclose configurations which display the connection configuration of the nodes constituting the bus system in correlation with the device names. The present embodiment provides a configuration which displays not only the connection configuration of the bus system but also the data flow among the constituent equipment.

Figure 21:
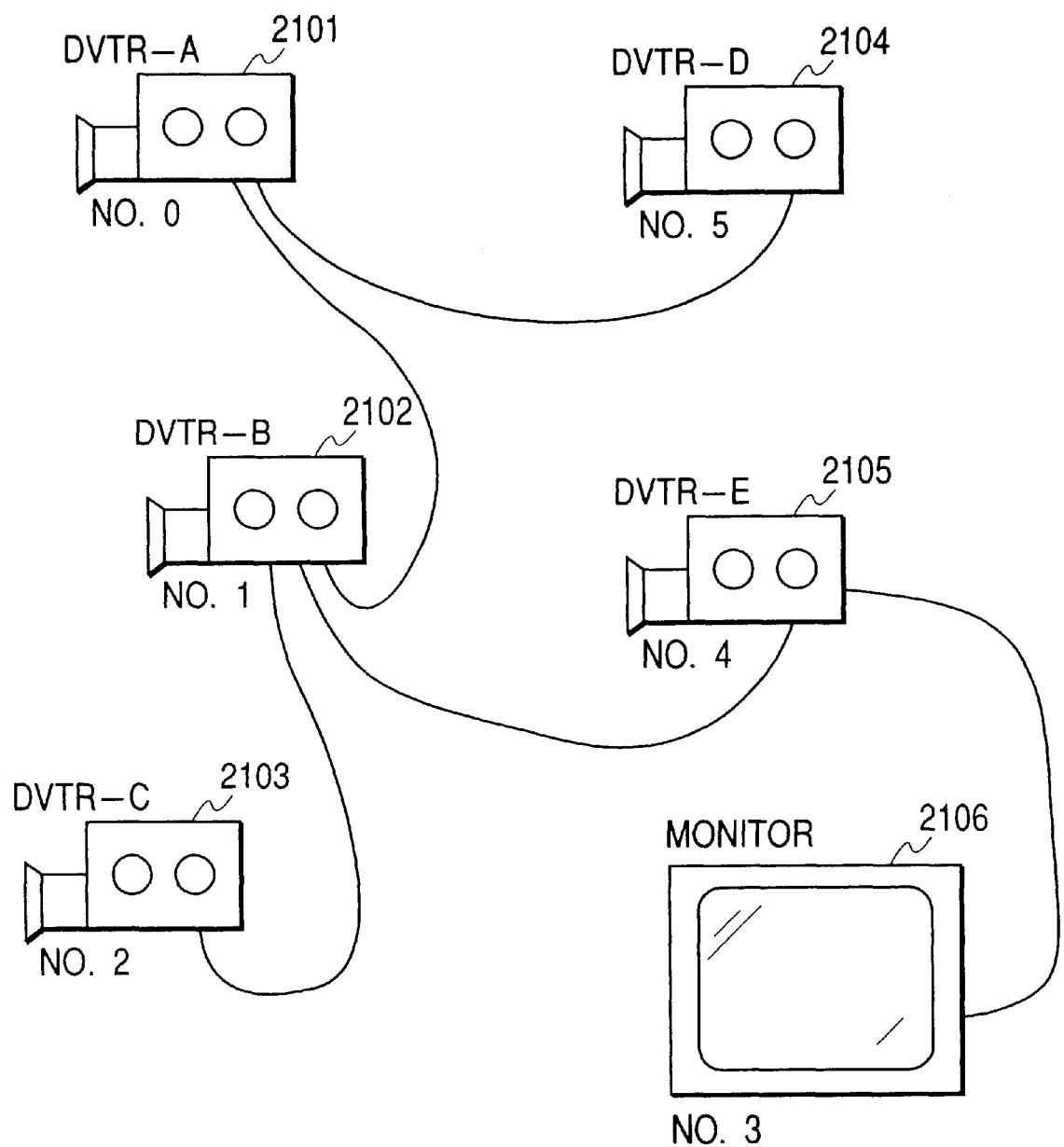
FIG. 21 is a view showing the configuration of a bus system in a fourth embodiment of the present invention.

FIG. 21 shows the configuration of a bus system constituting a fourth embodiment of the present invention, wherein the equipment (nodes) on the bus system are provided with 1394 interfaces.

In FIG. 21, there are provided camera-integrated digital video tape recorders (DVTR) 2101–2105 and a monitor 2106. The monitor 2106 is provided with a function of the bus manager based on the IEEE 1394 standard, and is capable, utilizing the topology map information, of displaying the connection configuration of the bus system for example with icons as shown in FIG. 11. Also the 1394 interface equipped in the monitor 2106 is provided with functions similar to those of the 1394 interface 1200 (or 1900) shown in FIG. 12 (or FIG. 19), thus being capable of correlating the equipment information (device name) and the node ID's of the nodes on the bus system and displaying these information together with the icons.

In the following there will be explained, with reference to FIG. 21, a process in which the image data reproduced in the DVTR 2103 are recorded in the DVTR 2101 and the image data reproduced in the DVTR 2102 are recorded in the DVTR's 2104 and 2105.

The image data reproduced in the DVTR 2103 and transferred in the isochronous transfer mode are packetized by a predetermined amount into an isochronous packet, of which configuration is detailedly shown in FIG. 6. The DVTR 2103 sets a channel number "0", assigned prior to the start of the isochronous transfer, in the channel number field 601 of the isochronous packet.

Also the image data reproduced in the DVTR 2102 and transferred in the isochronous transfer mode are similarly packetized by a predetermined amount into an isochronous packet. The DVTR 2102 sets a channel number "1", assigned prior to the start of the isochronous transfer, in the channel number field 601 of the isochronous packet.

The isochronous packets generated in the DVTR's 2103 and 2102 which constitute the transmitting nodes are broadcast on time-shared basis in every communication cycle. The DVTR's 2101, 2104 and 2105 constituting the receiving nodes receive these packets by detecting the channel numbers of such packets transferred from the partner of the communication.

Each of the nodes 2101–2106 is provided with a transmission connecting register 2205 and a reception connecting register 2206, and each node can recognize the flow of the isochronous data between the nodes by detecting the contents of these registers.

Figure 22:
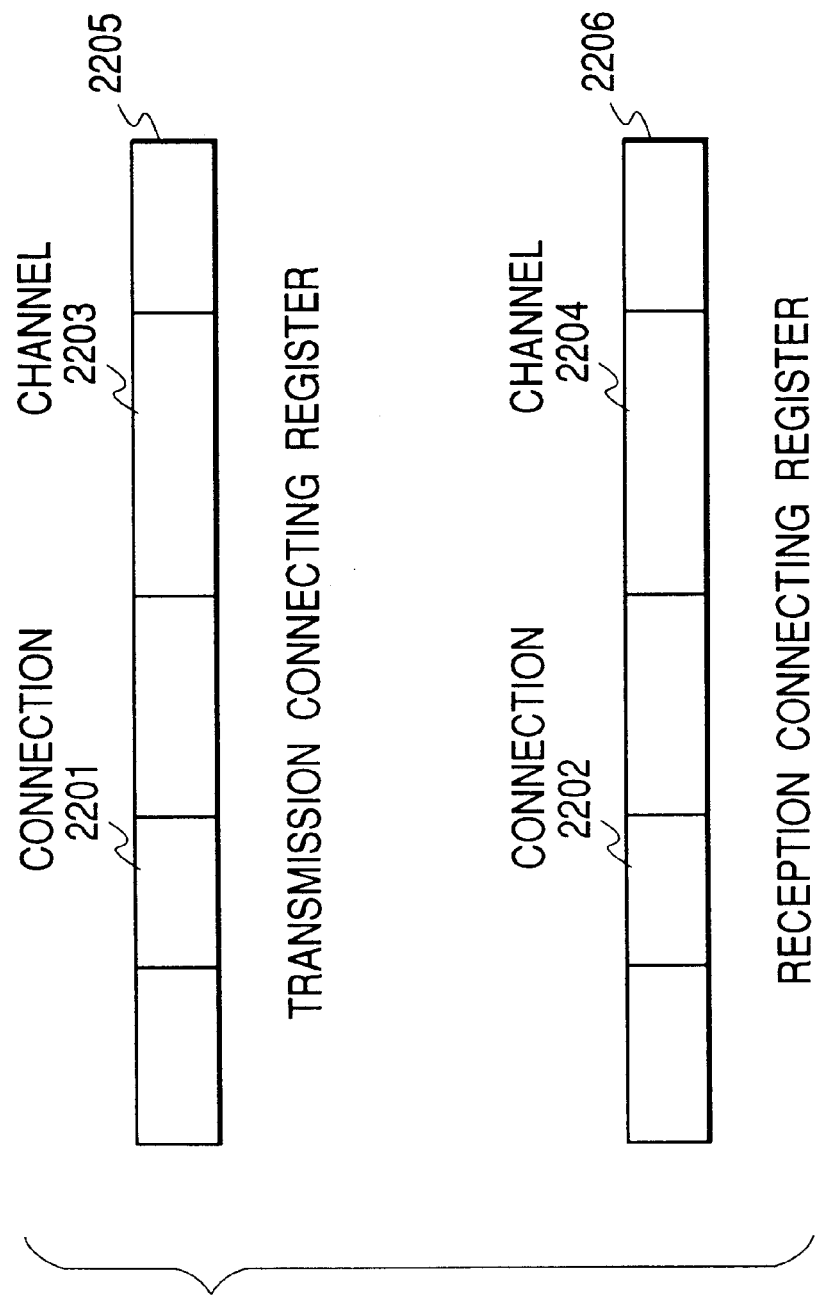
FIG. 22 is a view showing the configuration of a transmission connecting register 2205 and a reception connecting register 2206.

As shown in FIG. 22, each register is provided with a connection count field (2201, 2202) and a channel field (2203, 2204). The connection count field (2201, 2202) stores the number of the nodes constituting the partners of communication, while the channel field (2203, 2204) stores the channel number of the isochronous packet transferred with the communication partner.

As an example, there will be explained the content of the transmission connecting register 2205 of the DVTR 2103 which is a transmitting node, and the content of the reception connecting register 2206 of the DVTR 2101 which is a receiving node, in case of the example shown in FIG. 21. As the DVTR 2103 (transmitting node) has only one communication partner (destination) which is the DVTR 2101, the connection count field 2201 of the DVTR 2103 has a content "1". Also as the isochronous packets transferred between the DVTR's 2103 and 2101 have a channel number "0", the channel field 2203 of the DVTR 2103 has a content "0".

Also as the DVTR 2101 (receiving node) has only one communication partner (source) which is the DVTR 2103, the connection count field 2202 of the DVTR 2101 has a content "1". Also as the isochronous packets transferred between the DVTR's 2103 and 2101 have a channel number "0", the channel field 2204 of the DVTR 2101 has a content "0".

Similarly there will be explained the content of the transmission connecting register 2205 of the DVTR 2102 which is a transmitting node, and the contents of the reception connecting registers 2206 of the DVTR's 2104, 2105 which are receiving nodes, in case of the example shown in FIG. 21. As the DVTR 2102 (transmitting node) has two communication partners (destinations) which are the DVTR's 2104 and 2105, the connection count field 2201 of the DVTR 2102 has a content "2". Also as the isochronous packets transferred between the DVTR's 2102, 2104 and the DVTR's 2102, 2105 have a channel number "1", the channel field 2203 of the DVTR 2102 has a content "0".

Also as the DVTR's 2104, 2105 (receiving nodes) have only one communication partner (source) which is the DVTR 2102, the connection count field 2202 of the DVTR's 2105, 2105 have a content "1". Also as the isochronous packets transferred between the DVTR's 2102, 2105 and the DVTR's 2102, 2105 have a channel number "1", the channel field 2204 of the DVTR's 2104, 2105 have a content "1".

The monitor 2106 on the bus system has a function of managing the flow of the isochronous data transferred on the bus system and displaying such flow to the user, by checking the transmission connecting registers 2205 and the reception connecting registers 2206 of the nodes 2101–2106.

Figure 23:
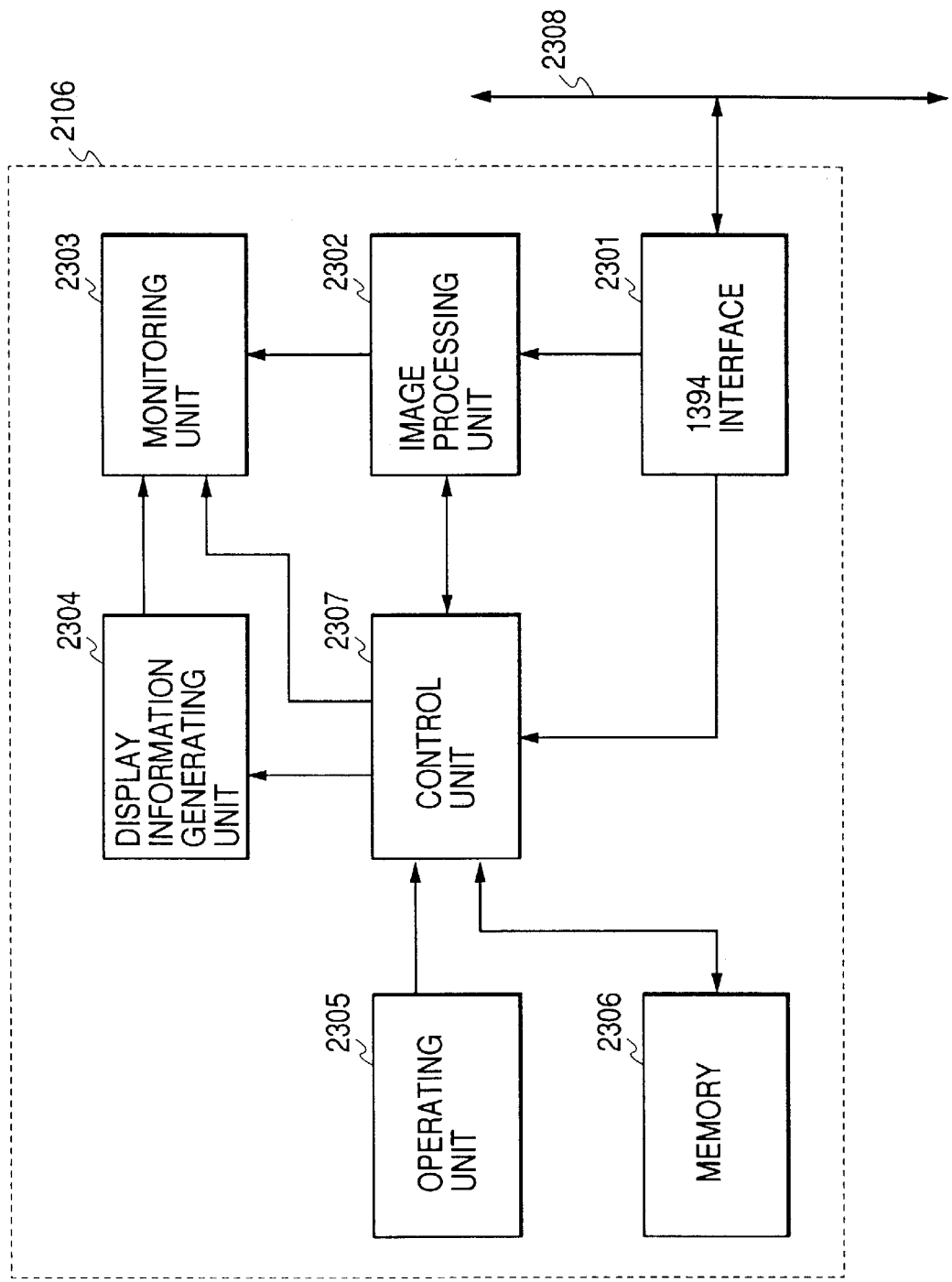
FIG. 23 is a detailed block diagram showing the configuration of a monitor 2106 in the fourth embodiment.

FIG. 23 is a detailed block diagram showing the configuration of the monitor 2106 of the fourth embodiment.

In FIG. 23, there are shown a 1394 interface 2301 based on the IEEE 1394 standard; an image processing unit 2302 for converting the image data, entered through the 1394 interface 2301, into a signal form suitable for display; a monitor unit 2303 capable of displaying the image data transferred from other nodes, and capable of displaying the nodes on the bus system for example in the form of icons; a display information generation unit 2304 for generating various display information such as icons of the nodes and message information; an operation unit 2305 for entering the instructions of the user by predetermined operations; a memory 2306 for storing information on the connection configuration of the bus system; a control unit 2307 including a microcomputer and adapted to control the functions of various process circuits 2301–2306; and a data bus 2308 connected with another node.

The 1394 interface 2301 has functions similar to those of the 1394 interface 1200 (or 1900) shown in FIG. 12 (or FIG. 19), and correlates the equipment information (device names) of the nodes with the node ID's at every bus resetting. For the purpose of managing the information relating to the flow of the isochronous data, the 1394 interface 2301 also inquires the contents of the transmission connecting register and of the reception connecting register of each node and the operation state (for example reproduction, recording, varied speed reproduction, external signal input, output to the exterior, stand-by etc.) of such node, when necessitated. A control command for inquiring these information is packetized in the asynchronous packet shown in FIG. 5 and is transferred in asynchronous manner.

The monitor 2106 correlates the results of these inquiries with the node ID's and the equipment information and generates a management table for managing these information.

FIG. 24 shows the content of the management table for managing the information relating to the flow of the isochronous data. The generated management table is stored in the memory 2306.

As shown in FIG. 24, there are provided an area 2401 containing the node ID's set on the nodes of the bus system; an area 2402 containing the equipment information (device names) of the nodes; an area 2403 containing the operation states of the nodes; an area 2404 indicating whether each node transmits the isochronous packet; an area 2405 indicating whether each node receives the isochronous packet; and an area 2406 containing the channel numbers used in the isochronous transfer.

Utilizing the management table shown in FIG. 24, the monitor 2106 can display, on the monitor unit 2303, the information relating to the flow of the isochronous data.

Figure 25:
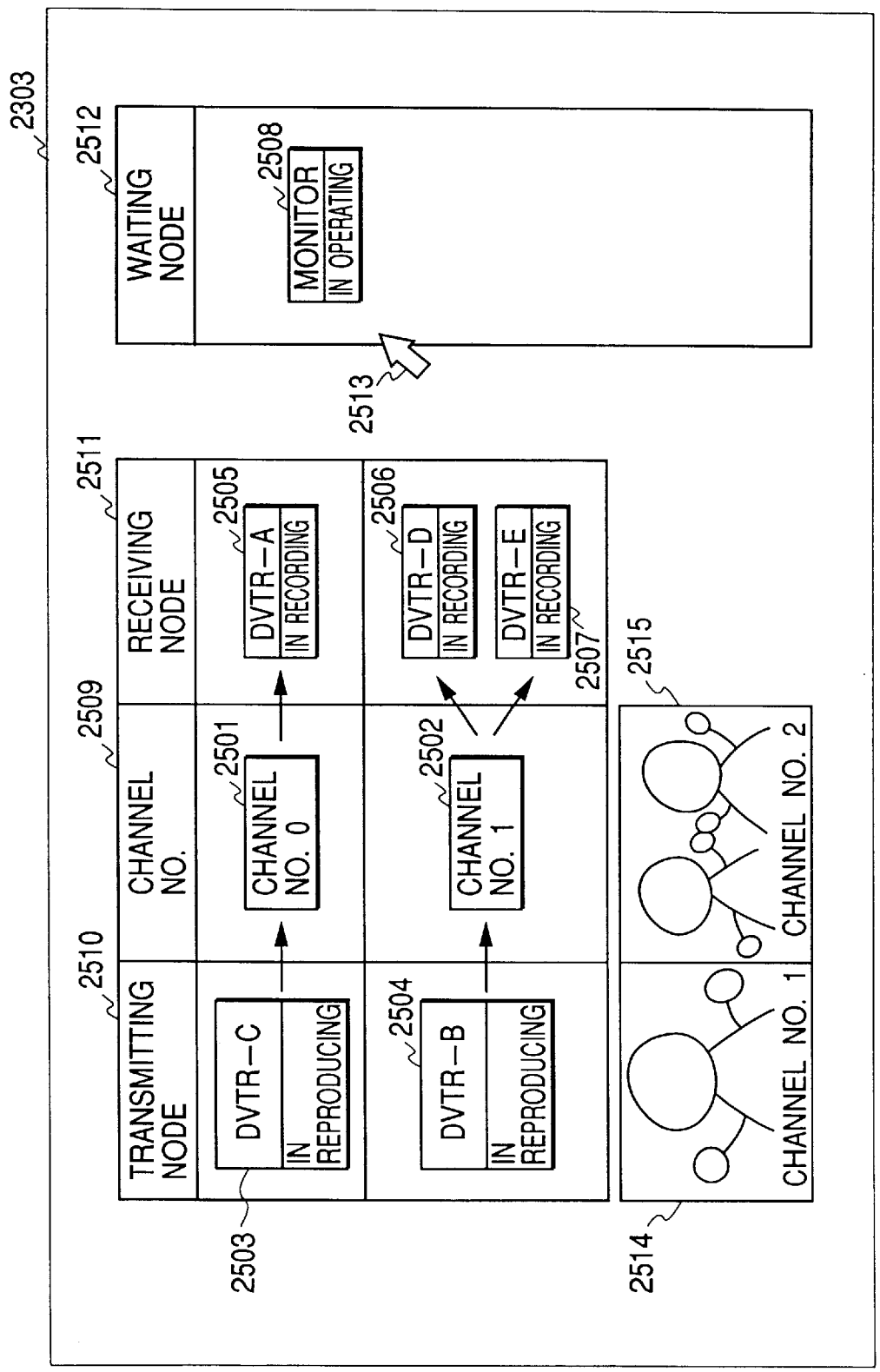
FIG. 25 is a view showing an example of the image field displayed on a monitor unit 2303.

FIG. 25 is a view showing an example of the display on the monitor 2303.

In FIG. 25, there are shown icons 2501, 2502 indicating the channel numbers of the isochronous transferred data; icons 2503, 2504 indicating the transmitting nodes; icons 2505–2507 indicating the receiving nodes; and an icon 2508 indicating a (waiting) node which is not in the isochronous transfer with other nodes. The icons 2503–2508 indicate the equipment information of the nodes and the information on the operation state thereof. The display information such as the icons and messages displayed on the monitor unit 2303 is generated by the display information generation unit 2304, based on the content of the management table.

In FIG. 25 there are also shown a field 2509 for displaying the icons indicating the channel numbers; a field 2510 for displaying the icons indicating the transmitting nodes; a field 2511 for displaying the icons indicating the receiving nodes; a field for displaying the icons indicating the waiting nodes; a pointer 2513 operated by the operation unit for actuating the icons and entering designated instructions; a field 2514 for displaying the isochronous data of the channel number "1", and a field 2515 for displaying the isochronous data of the channel number "2".

The display of the flow of the isochronous data on the bus system in the manner shown in FIG. 25 allows the user to recognize such flow of the isochronous data on the bus system.

Figure 26:
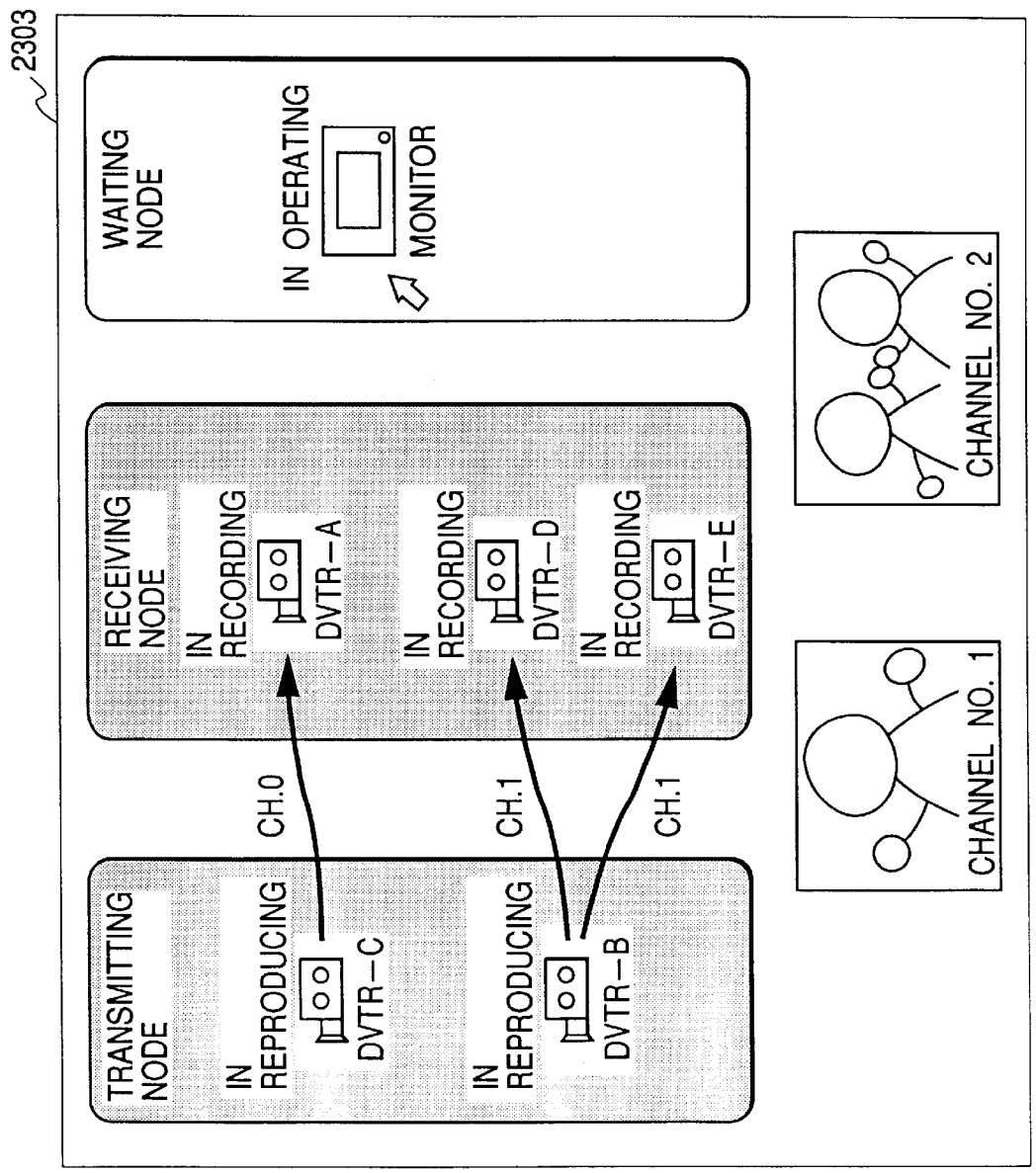
FIG. 26 is a view showing another example of the image field displayed on the monitor unit 2303.

Also the actual flow of the isochronous transfer can be varied by displacing the icons shown in FIG. 26 to the display fields 2509, 2511 and 2512.

For example, by dragging the icon 2506, representing the DVTR-D 2104, with the pointer 2513 and dropping it in the display field 2509 representing the channel number "0", the monitor 2106 requests to the DVTR-D 2104 that its partner of communication is changed to the channel number "0". In response the DVTR-D 2104 so changes the process as to receive the isochronous data of the channel number "0", and the monitor 2106 changes the content of the management table and the displayed image.

Also by dragging the icon 2503, representing the DVTR-C 2103 and dropping it in the display field 2512 showing the waiting node, the monitor 2106 requests to the DVTR-C 2103 and the DVTR-A 2101 that they terminate the isochronous transfer. In response the DVTR-C 2103 and the DVTR-A 2101 become the waiting nodes, and the monitor 2106 accordingly changes the content of the management table and the displayed image.

Also by clicking the icons 2501, 2502 indicating the channel numbers, there can be displayed the content of the isochronous data represented by these icons on the image 2514, 2515 of the monitor unit 2303.

Furthermore it is possible to display the information, relating to the flow of the isochronous data, as shown in FIG. 26, wherein arrows indicate the flow of the isochronous data. The user can cause the isochronous data, indicated by an arrow, to be received by a waiting node, by dragging an icon displayed in the field of the waiting nodes and dropping it on the displayed arrow. In response the monitor 2106 request the designated waiting node that it receives the designated isochronous data, and changes accordingly the content of the management table and the displayed image.

As explained in the foregoing, the fourth embodiment allows the user to easily recognize the connection state of the nodes and the flow of the data transferred among such nodes, by the display of the display information (icon etc.) representing the flow of the isochronous data among the nodes constituting the bus system and the operation state of such nodes.

Also the actual data flow can be easily modified by the operations on the display information (icon etc.) representing the flow of the isochronous data.

Other Embodiments

The foregoing embodiments can also be so constructed that a memory medium, storing program codes of a software realizing the functions of these embodiments, is supplied to a control unit (including a microcomputer) provided in the system or the apparatus in the foregoing embodiments, and such embodiments of the present invention can be realized by the operation of the control unit provided in the system or the apparatus of the foregoing embodiments, by reading the program codes stored in the memory medium and operating various process circuits provided in the system or the apparatus of the foregoing embodiments in such a manner as to realize the functions thereof. As an example, the flow chart shown in FIGS. 17 and 18 are converted into program codes, which are stored in the memory 1604 shown in FIG. 16 and supplied to the control unit 1602.

In such case, the program codes read from the memory medium realize the functions of the foregoing embodiments, and the memory medium storing such program codes constitutes a part of the present invention.

The memory medium employed for supplying the program codes can be, for example, a floppy disk, a hard disk, an optical disk, a magnetooptical disk, a CD-ROM, a CD-R, a magnetic tape, a non-volatile memory card or a ROM.

Furthermore, the present invention naturally includes a case wherein, according to the instructions of the program codes read by the control unit from the memory medium, an operation system, an application software or the like functioning on the control unit controls the functions of the various process circuits provided in the system or the apparatus of the foregoing embodiments, thereby attaining the functions of the foregoing embodiments.

Furthermore, the present invention includes a case wherein the program codes read from the memory medium are written into a memory provided in a function expanding board or a function expanding unit connected to the control unit, and a CPU provided in such function expanding board or function expanding unit controls the functions of the various process circuits provided in the system or the apparatus of the foregoing embodiments, according to the instructions of the program codes, thereby attaining the functions of the foregoing embodiments.

The present invention may be embodied in other specific forms without departing from the spirit of essential characteristics thereof.

For example, the foregoing embodiments have been explained by communication systems composed of data communication apparatus provided with 1394 interfaces based on the IEEE 1394 standard, but the present invention are not limited to such embodiments and is applicable to any communication system that has a function of automatically recognizing and setting the ID information set on the equipment of the network according to the change in the network configuration resulting from the addition or deletion of the electronic equipment.

Also in the foregoing embodiments, the communication interface of each node constituting the network is composed of a digital interface based on the IEEE 1394 standard, but there may be employed any interface provided with a transfer mode that ensures the transmission and reception of a predetermined amount of packet within a communication cycle time (125 $\mu$s) and another transfer mode that transmits and receives the control commands, files etc. in asynchronous manner according to the necessity.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to the equivalents of the claims are considered to fall within the scope of the present invention.

What is claimed is:

1. A data communication apparatus, said apparatus comprising:
   (a) a communication unit arranged to query each of a plurality of devices to obtain contents of a first register and a second register, the first register storing a channel number which is used to transmit data and the second register storing a channel number which is used to receive data;
   (b) a detector arranged to detect a flow of data between a first device and a second device based on the contents of the first register and the second register; and
   (c) a display controller arranged to control a display unit to display the flow of the data between the first device and the second device.

2. An apparatus according to claim 1, further comprising a management unit arranged to manage the contents of the first register and the second register with ID information set on said plurality of devices.

3. An apparatus according to claim 1, wherein said display controller controls the display unit to display the flow of the data, a device name of the first device, and a device name of the second device.

4. An apparatus according to claim 1, wherein said display controller controls the display unit to display the flow of the data, an operation state of the first device, and an operation state of the second device.

5. An apparatus according to claim 1, wherein said display controller controls the display unit to display contents of the data.

6. An apparatus according to claim 1, wherein said detector detects a flow of an image data between the first device and the second device based on the contents of the first register and the second register.

7. An apparatus according to claim 6, wherein the image data is transmitted between said first device and said second device in an isochronous transfer mode.

8. An apparatus according to claim 1, wherein said communication unit conforms to the IEEE 1394-1995.

9. A method for operating data communication apparatus, said method comprising steps of:

(a) querying each of a plurality of devices to obtain contents of a first register and a second register, the first register stores a channel number which is used to transmit data and the second register stores a channel number which is used to receive data;

(b) detecting a flow of data between a first device and a second device based on the contents of the first register and the second register; and (c) controlling a display unit to display the flow of the data between the first device and the second device.

10. A method according to claim 9, further comprising a step of managing the contents of the first register and the second register with ID information set on said plurality of devices.

11. A method according to claim 9, wherein said controlling step includes controlling the display unit to display the flow of the data, an device name of the first device, and a device name of the second device.

12. A method according to claim 9, wherein said controlling step includes controlling the display unit to display the flow of the data, an operation state of the first device, and an operation state of the second device.

13. A method according to claim 9, wherein said controlling step includes controlling the display unit to display contents of the data.

14. A method according to claim 9, wherein said querying step includes querying the contents of the first and second register using a communication unit conforms to the IEEE 1394-1995.

* * * * *

UNITED STATES PATENT AND TRADEMARK OFFICE
CERTIFICATE OF CORRECTION

PATENT NO.    : 6,332,159 B1
DATED         : December 18, 2001
INVENTOR(S)   : Shinichi Hatae et al.

It is certified that error appears in the above-identified patent and that said Letters Patent is hereby corrected as shown below:

<u>Title page,</u>
Item [54], the Title should read -- DATA COMMUNICATION APPARATUS AND CONTROLLING METHOD THEREOF --.

Signed and Sealed this

Twenty-ninth Day of October, 2002

*Attest:*

*Attesting Officer*

JAMES E. ROGAN
*Director of the United States Patent and Trademark Office*